United States Patent [19]
Tsukamoto et al.

[11] Patent Number: 5,588,927
[45] Date of Patent: Dec. 31, 1996

[54] CONTROL SYSTEM FOR AUTOMATIC TRANSMISSION

[75] Inventors: Kazumasa Tsukamoto, Toyota; Masahiko Ando, Okazaki; Masahiro Hayabuchi, Anjo; Akira Fukatsu, Anjo; Toshiyuki Mae, Anjo; Masato Kaigawa; Kagenori Fukumura, both of Toyota; Hidehiro Oba, Aichi-gun; Yasuo Hojo, Nagoya; Hiromichi Kimura; Atsushi Tabata, both of Okazaki; Tetsuo Hamajima; Nobuaki Takahashi, both of Toyota, all of Japan

[73] Assignees: Aisin AW Co., Ltd.; Toyota Jidosha Kabushiki Kaisha, both of Japan

[21] Appl. No.: 455,677

[22] Filed: Jun. 1, 1995

[30]     Foreign Application Priority Data

Jun. 2, 1994  [JP]  Japan .................................. 6-142203
Dec. 2, 1994  [JP]  Japan .................................. 6-329494

[51] Int. Cl.$^6$ ................................................. F16H 61/00
[52] U.S. Cl. ................................................. 475/128
[58] Field of Search .................................. 475/116, 128

[56]                  References Cited

U.S. PATENT DOCUMENTS

| | | | |
|---|---|---|---|
| 3,605,525 | 9/1971 | Pierce et al. ............................ | 475/128 |
| 4,555,964 | 12/1985 | Sugano ................................... | 475/128 |
| 4,674,364 | 6/1987 | Shindo et al. ........................... | 475/128 |
| 4,724,727 | 2/1988 | Shibayama et al. ..................... | 475/128 |
| 5,115,696 | 5/1992 | Tajada et al. ............................ | 475/116 |
| 5,472,389 | 12/1995 | Ando et al. .............................. | 475/128 |

*Primary Examiner*—Dirk Wright
*Attorney, Agent, or Firm*—Lorusso & Loud

[57]                      ABSTRACT

A control system for an automatic transmission includes a first frictional engagement element and a second frictional engagement element; and a first hydraulic servo for controlling the application/release of the first frictional engagement element and a second hydraulic servo for controlling the application/release of the second frictional engagement element. A regulator valve regulates the oil pressure to the first hydraulic servo. A signal pressure is applied to the regulator valve to establish a predetermined gear stage by switching the applied/released states of the first frictional engagement element and the second frictional engagement element by feeding/releasing oil pressure to/from the first hydraulic servo and the second hydraulic servo. The regulator valve includes a valve member having: a first pressure receiving area to which is applied the feed pressure to the first hydraulic servo as a feedback pressure in a first direction; a second pressure receiving area to which is applied the signal pressure in a second direction opposite the first direction; a fourth pressure receiving area to which is applied the feed pressure to the second hydraulic servo in the first direction, in a shift wherein the first frictional engagement element is released while the second frictional-engagement element is applied; and a third pressure receiving area to which is applied the signal pressure in the second direction, for regulation of the oil pressure only during a shift.

14 Claims, 16 Drawing Sheets

|      | C-0 | C-1 | C-2 | B-0 | B-1 | B-2 | B-3 | B-4 | F-0 | F-1 | F-2 |
|------|-----|-----|-----|-----|-----|-----|-----|-----|-----|-----|-----|
| N    |     |     |     | ◌   |     |     |     |     |     |     |     |
| Rev  |     |     | ○   | ○   |     |     |     | ○   |     |     |     |
| 1st  | ○   | ○   |     |     |     |     |     | ●   | ○   |     | ○   |
| 2nd  | ●   | ○   |     |     |     | ○   |     |     | ○   |     |     |
| 3rd  | ○   | ○   |     |     | ●   | ○   |     |     | ○   | ○   |     |
| 4th  | ○   | ○   | ○   |     |     | ◉   |     |     | ○   |     |     |
| 5th  |     | ○   | ○   | ○   |     | ◉   |     |     |     |     |     |

CONTROL SYSTEM FOR AUTOMATIC TRANSMISSION

BACKGROUND OF THE INVENTION

1. Field of the Invention

The present invention relates to a control system for an automatic transmission and, more particularly, to a control system for switching engagement and release of frictional engagement elements in a transmission mechanism so as to shift the automatic transmission.

2. Related Art

One type of prior art automatic transmission has a gear train construction which applies one frictional engagement element while simultaneously releasing another frictional engagement element, e.g., brakes or clutches, in shifting between two specific gear stages. In such a gear train, one-way clutches are arranged in parallel with the individual frictional engagement elements to optimize the timing of application/release to thereby avoid a drop in the output shaft torque due to tie-up or engine racing due to under-lap. In the interest of compactness, other transmissions omit the one-clutch. In this case, oil pressure feeding/releasing oil passages for the two frictional engagement elements muse be provided with dedicated valves for controlling the release of the oil pressure from one frictional engagement element and the oil pressure feed to the other in a related manner. Such a control system is exemplified in the prior art by that disclosed in Japanese Patent Laid-Open No. 157168/1993. In this prior art control system, the valve (i.e., 2–3 timing valve) for controlling the oil pressure of the frictional engagement element to be released for a shift from 2nd speed to 3rd speed (abbreviated as "2nd→3rd" as in other shifts) is arranged separately from a valve (i.e., B-3 control valve) for controlling the oil pressure of the same frictional engagement element in a different shift.

However, the above-described prior art design is not always suitable for making the control system sufficiently compact to meet the demands for a multistage, light-weight automatic transmission. While compactness might be improved by integrating the aforementioned two valves to perform the two functions with a single valve, such an integrated structure would create other problems. Specifically, in one shift (e.g., 2nd→3rd) the valve would have its spool actuated to control the first frictional engagement element (i.e., brake B-3) by applying the oil pressure of the applied side frictional engagement element (i.e., the brake B-2) and the released side frictional engagement element (i.e., the brake B-3) in a first direction and by applying the external control signal pressure (i.e., SLU linear solenoid valve pressure) in an opposite, second direction. In another shift, on the other hand, the first frictional engagement element (i.e. the brake B-3) would be controlled by the relation between the external control signal pressure and only the oil pressure of that element, so that the external control signal pressure for ensuring the complete engagement of the element must be higher for the first-mentioned shift (i.e., 2nd→3rd), than for the remaining shifts. However, the oil pressure range in which the valve (i.e., the linear solenoid valve SLU) can accurately output the external control signal pressure, is limited of itself. If, therefore, the output range is widened to cover such a shift, the accuracy of the oil pressure output at the remaining shifting times is reduced. If, however, the control for the shift is to be made within such an output range as can retain accuracy, the engagement of the first frictional engagement element cannot be retained.

SUMMARY OF THE INVENTION

In order to solve the above-specified problems, therefore, it is an object of the present invention to provide a control system for an automatic transmission, which can be made compact by satisfying the oil pressure control conditions of the first frictional engagement element using a highly accurate integrated valve.

In order to achieve the above-mentioned objective, according to a first aspect of the present invention, there is provided a control system for an automatic transmission comprising: a first frictional engagement element and a second frictional engagement element; a first hydraulic servo for controlling the application/ release of said first frictional engagement element and a second hydraulic servo for controlling the application/release of said second frictional engagement element; an oil passage connected to said first hydraulic servo for feeding/releasing an oil pressure to/from said first hydraulic servo; a regulator valve disposed in said oil passage for regulating the oil pressure in said oil passage; and signal pressure generating means for applying a signal pressure to said regulator valve, whereby a predetermined gear stage is established by changing the applied/ released states of said first frictional engagement element and said second frictional engagement element by feeding/ releasing the oil pressure to/from said first hydraulic servo and said second hydraulic servo. The valve member of the regulator includes: a first pressure receiving area to which is applied a feed pressure to said first hydraulic servo as a feedback pressure in a first direction; a second pressure receiving area to which is applied said signal pressure in a second direction opposite said first direction; a fourth pressure receiving area to which is applied a feed pressure to said second hydraulic servo in said first direction at the time of a shift when said first frictional engagement element is released while said second frictional engagement element is simultaneously applied; and a third pressure receiving area to which is applied said signal pressure in said second direction, for participating in the regulation of the oil pressure in said first oil passage only at the time of a shift.

According to a second aspect of the present invention, there is provided a control system for an automatic transmission comprising: a first frictional engagement element and a second frictional engagement element; a first hydraulic servo for controlling the application/release of said first frictional engagement element and a second hydraulic servo for controlling the application/release of said second frictional engagement element; an oil passage connected to said first hydraulic servo for feeding/releasing an oil pressure to/from said first hydraulic servo; a regulator valve disposed in said oil passage for regulating the oil pressure in said oil passage; and signal pressure generating means for applying a signal pressure to said regulator valve, whereby a predetermined gear stage is established by changing the applied/ released states of said first frictional engagement element and said second frictional engagement element by feeding/ releasing the oil pressure to/from said first hydraulic servo and said second hydraulic servo. The valve member of said regulator valve includes: a first pressure receiving area to which is applied a feed pressure to said first hydraulic servo as a feedback pressure in a first direction; a second pressure receiving area to which is applied said signal pressure in a second direction opposite said first direction; a fourth pressure receiving area to which is applied the feed pressure to said second hydraulic servo in said first direction at the time of a shift wherein said first frictional engagement element is released while said second frictional engagement element is applied; and a third pressure receiving area to which is applied said signal pressure in said second direction, for withdrawing its participation in the regulation of the oil pressure in said first oil passage at said shifting time.

In the present invention, according to the first feature, at the time of a shift involving simultaneous release of a first frictional engagement and application of a second frictional engagement element, wherein oil pressure is fed to the second hydraulic servo for controlling the application/release of the second frictional engagement element, not only the signal pressure applied to the second pressure receiving area, but also the signal pressure applied to the third pressure receiving area participate in regulation of the oil pressure in the first oil passage. As a result, the regulator valve is able to regulate the oil pressure to the first hydraulic servo by the relationship between the signal pressures applied to its two pressure-receiving areas, the feed pressure to the second hydraulic servo and the feedback pressure from the first hydraulic servo. In other shifts, on the contrary, the signal pressure applied to the third pressure receiving area does not participate in the operation to regulate the oil pressure in the first oil passage, so that the regulator valve regulates the oil pressure to the first hydraulic servo in accordance with the relation between the signal pressure applied to its second pressure receiving area and the feedback pressure from the first hydraulic servo.

According to the second feature, moreover, at the time of a shift involving simultaneous release of a first frictional engagement element and application of a second frictional engagement element, wherein oil pressure is fed to the second hydraulic servo for controlling the application/release of the second frictional engagement element, the signal pressure applied to the third pressure receiving area does not participate in the regulation of the oil pressure in the first oil passage. As a result, the regulator valve is able to control the oil pressure to the first hydraulic servo by the relationship between the signal pressure applied to the second pressure receiving area, the feed pressure to the second hydraulic servo and the feedback pressure from the first hydraulic servo. At other shifts, on the contrary, the signal pressure applied to the third pressure receiving area participates in the regulation of the oil pressure in the first oil passage so that the regulator valve controls the oil pressure to the first hydraulic servo in accordance with the relationship between the signal pressure applied to the second pressure receiving area and the third pressure receiving area and the feedback pressure from the first hydraulic servo.

Thus, according to the first and second features of the present invention, the force to counterbalance the oil pressure which is applied to the control valve from the frictional engagement element applied in a simultaneous release/apply shift, cannot be obtained by increasing the external control signal pressure itself but, rather, by increasing the receiving area for the signal pressure. As a result, increase in the range of the external control signal pressure, which might otherwise be caused by unifying the valve, can be avoided in making the control system compact, without sacrifice of accuracy.

DESCRIPTION OF THE PREFERRED EMBODIMENTS

Preferred embodiments of the present invention will now be described with reference to the accompanying drawings.

Figure 1:
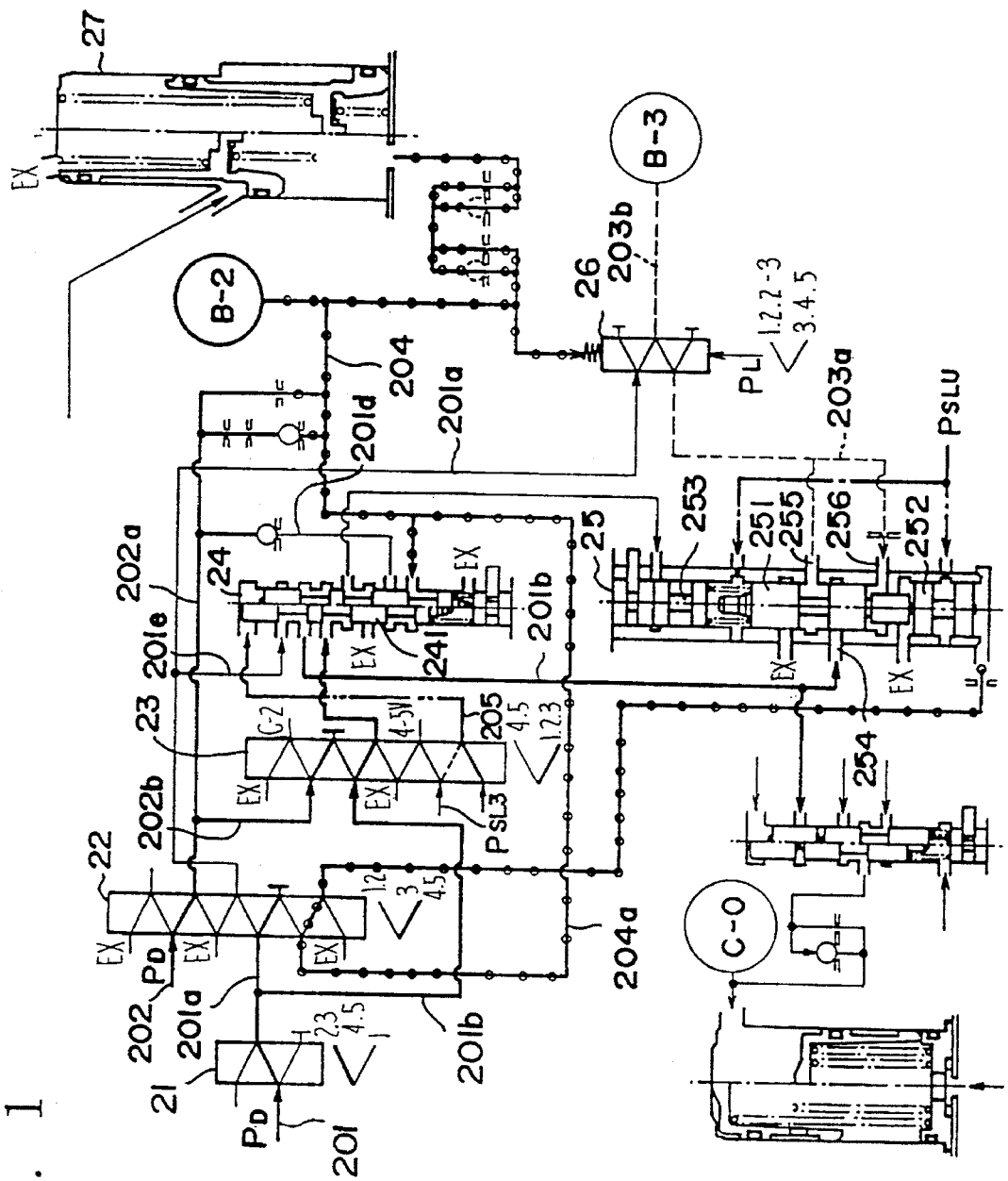
FIG. 1 is a hydraulic circuit diagram of a portion of a hydraulic control system for an automatic transmission according to a first embodiment of the present invention.
Figures 2, 3:
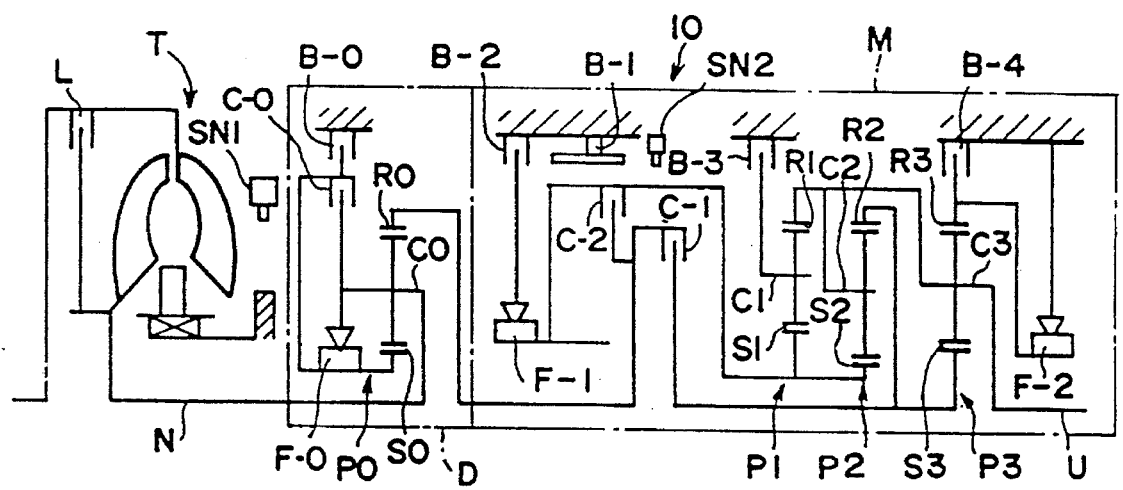
FIG. 2 is a skeletal diagram of a portion of the automatic transmission.
FIG. 3 is an operational chart for the automatic transmission.

FIGS. 1 to 10 show a first embodiment of the present invention. As shown in FIG. 2, an automatic transmission 10 provides five speeds, i.e. four forward speeds and one reverse, by combining an auxiliary transmission mechanism D composed of a pre-overdrive planetary gear unit and a main transmission mechanism M composed of simply connected three-planetary gear sets. The mechanical portion thus constructed is connected to a torque converter T having a lockup clutch L.

The auxiliary transmission mechanism D is equipped with: a one-way clutch F-Q in association with a sun gear SO, a carrier CO and a ring gear RO; a multidisc clutch C-0 in parallel with the one-way clutch FO; and a multi-disc brake B-0 in series with the multi-disc clutch C-0. On the other hand, the main transmission mechanism M is equipped with three sets of simply connected planetary gear units P1 to P3 composed of sun gears S1 to S3, carriers C1 to C3 and ring gears R1 to R3. The main transmission mechanism M is provided with multi-disc clutches C-1 and C-2, a band brake B-I, multi-disc brakes B-2 to B-4, and one-way clutches F-1 and F-2 in association with the transmission elements of the individual gear units. Incidentally, in FIG. 2, SN1 designates a C0 sensor for detecting the drum rotation of the clutch C-0, and SN2 designates a C2 sensor for detecting the drum rotation of the clutch C-2. Moreover, the individual clutches and brakes are equipped with hydraulic servo units composed of piston-cylinder mechanisms for applying/releasing their friction members, although not shown.

Figure 4:
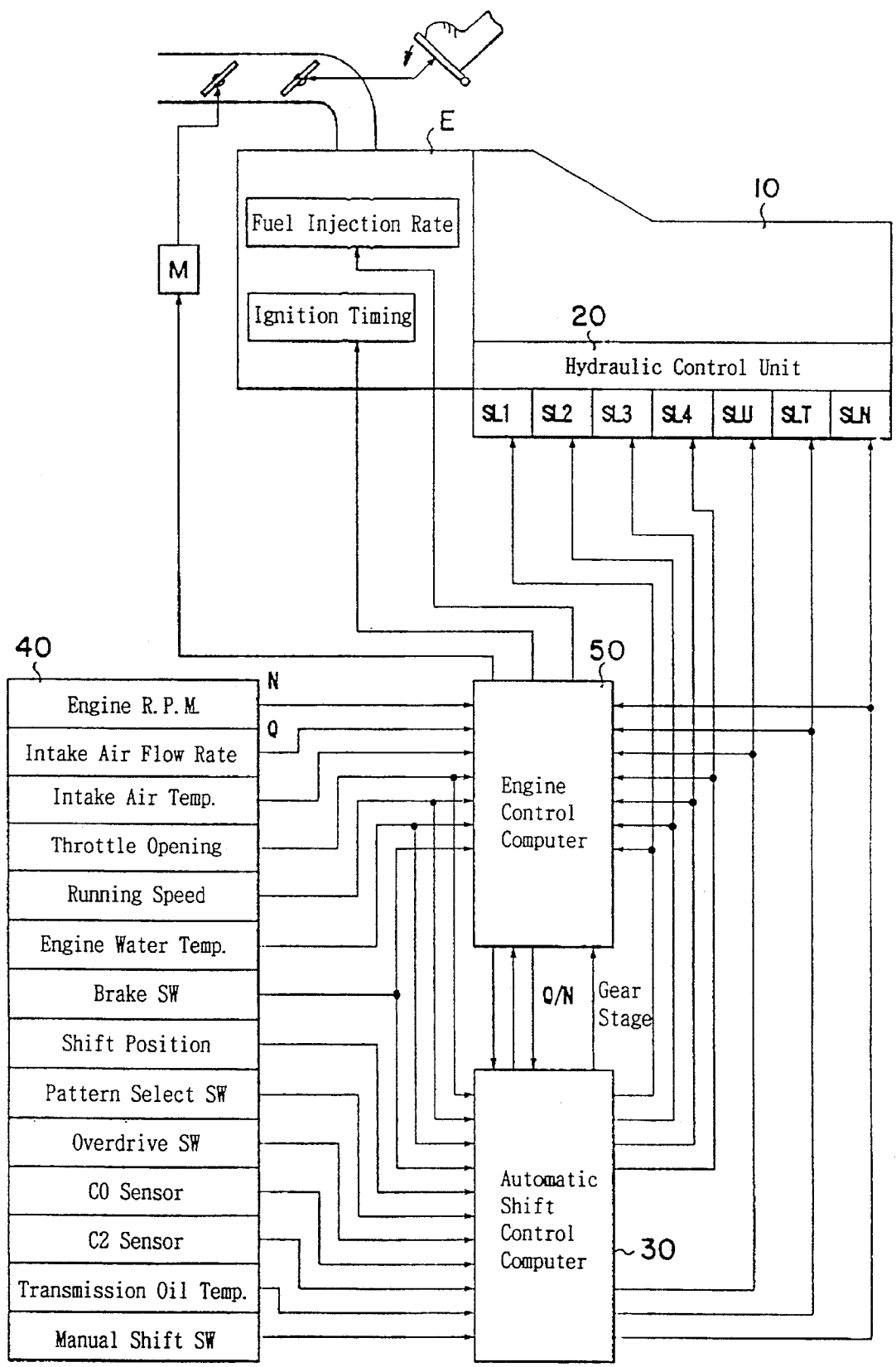
FIG. 4 is a block diagram of the control system of the first embodiment.

As shown in FIG. 4, the automatic transmission 10 is equipped with: a hydraulic control system 20 for controlling the mechanical portion having the aforementioned construction, a torque converter and the lockup clutch; and the not-shown oil pump which is built in the mechanical portion as the oil pressure source for the hydraulic control system 20. The automatic transmission 10 is connected, when mounted on the vehicle, to an engine E and has its hydraulic control system 20 connected with an automatic transmission control computer 30 through individual solenoid valves SL1 to SL4 and individual linear solenoid valves SLN, SLT and STU, which are built in the hydraulic control system 20. The automatic transmission control computer 30 receives signals from a variety of sensors 40, which are arranged in the individual portions of the vehicle including the engine E and the automatic transmission 10; and an engine control computer 50.

In this automatic transmission 10, the rotation of the engine E shown in FIG. 4 is transmitted to the input shaft N of the auxiliary transmission mechanism D through the torque converter T shown in FIG. 2. Moreover, the rotation of the input shaft N is input to the sun gear S3 of the gear unit P3 under the control of the hydraulic control system with the clutch C-0 being applied to directly connect the auxiliary transmission mechanism D, with the clutch C-1 of the main transmission mechanism M being applied and with all the remaining frictional engagement elements being released. 1st-speed rotation is output to an output shaft U from the carrier C3 by prevention of reverse rotation of the ring gear R3 by the one-way clutch F-2.

2nd-speed rotation is established when the auxiliary transmission mechanism D is directly connected so that the clutch C-1 and the brake B-3 are applied. At this time, the input at the ring gear R2 of the gear unit P2 is output, by using the carrier C1 of the gear unit P1 as a reaction element, to the carrier C2 of the gear unit P2 and the ring gear R1 of the gear unit P1, which is directly connected to the carrier C2, so that it establishes the 2nd-speed rotation of the output shaft U.

3rd-speed rotation is established, too, when the auxiliary transmission mechanism D is directly connected to apply the clutch C-1 and the brake B-2 while releasing the other frictional engagement elements. In 3rd-speed, the input having entered the ring gear R2 of the gear unit P2 is output to the carrier C2 by using the sun gear S2 as a reaction element so that it establishes the 3rd-speed rotation of the output shaft U.

4th-speed rotation is established, too, when the auxiliary transmission mechanism D is directly connected to apply both the clutch C-1 and the clutch C-2. At this time, the input rotation is input to the ring gear R2 and the sun gear S2 so that the gear unit P2 is directly connected to output the input rotation as is.

5th-speed is established, when the main transmission mechanism M is in the state of the aforementioned 4th-speed rotation, by releasing the clutch C-0 and applying the brake B-0 to fix the sun gear S0 to thereby accelerate the auxiliary transmission mechanism D. On the other hand, reverse is established when the auxiliary transmission mechanism D is in the aforementioned state, by applying the clutch C-2 and the brake B-4 of the main transmission mechanism M. In reverse, the input having entered the sun gear S2 of the gear unit P2, is output as the reverse rotations of the carriers C2 and C3 of the gear units P2 and P3, using the ring gear R3 as a reaction element.

The applied/released relationships of the individual frictional engagement elements and the one-way clutches at the aforementioned individual gear stages are tabulated in the operation chart of FIG. 3. In FIG. 3: blank circles ○ designate application of the clutches and brakes and the locking of the one-way clutches; solid circles ● designate the application only in engine braking; a broken circle ○ designates either application or release; and double circles ⊙ designate the application without any power transmission.

In the automatic transmission 10 thus constructed, according to the present invention, a first frictional engagement element is exemplified by the brake B-3, and the second frictional engagement element is exemplified by the brake B-2. As shown in FIG. 1, that portion of the hydraulic circuit, which is directly related to the regulation and the feed/release of the oil pressure to/from the hydraulic servo units for applying/releasing the brake B-3 and the brake B-2, includes a 1-2 shift valve 21, a 2-3 shift valve 22, a 3-4 shift valve 23, a B-2 release valve 24, a B-3 control valve 25, a relay valve 26 and a B-2 accumulator 27. These hydraulic components are controlled by the solenoid valves SL1 to SL4 for switching the individual shift valves, a lockup linear solenoid valve SLU, the accumulator control linear solenoid valve SLN for controlling the B-2 accumulator 27 and its back pressure, the linear solenoid valve SLT for outputting a control signal according to the engine load to the linear solenoid valve SLU, and so on.

The control valve 25, located in the oil passage feeding/releasing the oil pressure to/from the brake B-3, includes: a spool 251 urged by the fed-back oil pressure of the brake B-3 in one direction (i.e., upward in the drawing) and by an external control signal oil pressure (i.e., the signal pressure output from the linear solenoid valve SLU) $P_{SLU}$, to regulate the oil pressure of the brake B-3 in accordance with those received pressures; and a plunger 252 arranged coaxially in series with the spool 251 and urged upwardly in the drawing by the oil pressure of the brake B-2, in a shift applying the brake B-2 and releasing the brake B-3, and urged downwardly in the drawing by the linear solenoid valve SLU signal pressure in the same shift. When the oil pressure of the brake B-2 is applied, the plunger 252 is brought into abutment against the spool 251 so that it interlocks with the spool 251.

The feed of the oil pressure to the control valve 25 for regulating the brake B-3 oil pressure is effected through the 1-2 shift valve 21, acting as the shift valve which is not switched at the time of a shift with application/release of brakes B-2 and B-3. Between the control valve 25 and the brake B-3, is provided the relay valve 26 controlled by the oil pressure coming from the brake B-2.

The connections between the aforementioned individual valves and oil passages will now be described in detail. A D-range oil passage 201 leading to the not-shown manual valve is branched through the 1-2 shift valve 21, and one branch is oil passage 201a which is connected through the 2-3 shift valve 22 to the relay valve 26 and further to a brake B-3 oil passage 203b. The other branch is oil passage 201b which leads through the 3-4 shift valve 23 and the B-2 release valve 24 to the in-port 254 of the B-3 control valve 25, from which the oil passage 201b is connected through an oil passage 203a to the relay valve 26.

The other D-range pressure oil passage 202 leading to the manual valve branches through the 2-3 shift valve 22, and one branch is oil passage 202a which is connected through an orifice to a brake B-2 oil passage 204. This oil passage 204 is connected through the B-2 release valve 24 and a check valve to the oil passage 202a and through an orifice to the accumulator 27. The other branch is oil passage 202b which is connected through the 3-4 shift valve 23 to the clutch C-2.

The 3-4 shift valve 23 connects through a solenoid valve signal pressure oil passage 205 (as indicated by double-dotted lines in FIG. 1) to the B-2 release valve 24, not only to provide and interrupt the communication between the two oil passages 201b and 202b, but also to apply a solenoid valve SL3 signal pressure ($P_{SL3}$) to the spool end of the B-2 release valve 24.

The B-2 release valve 24 is formed with a bypass circuit for accelerating the drainage of the oil passage of the accumulator 27 at the release end of the brake B-2 and is equipped with a spring-loaded spool 241. The B-2 release valve 24, at the end of the spool 241, receives the signal pressure ($P_{SL3}$) Of the solenoid valve SL3 by way of the 3-4 shift valve 23, so as to provide or block the communication of a bypass oil passage 201d with the brake B-2 oil passage 204, to switch the communication of the D-range pressure oil passage 201b between the in-port 254 of the B-3 control valve 25 and a signal port at the end of a plunger 253, and to provide or block the communication of an oil passage 201e branched from the other D-range pressure oil passage 201a. As a result, the in-port 254 of the B-3 control valve 25 can be fed with a D-range pressure ($P_D$) from the two oil passages 201b and 201e through the 1-2 shift valve 21 in parallel with the 2-3 shift valve 22 and the 3-4 shift valve 23.

The B-3 control valve 25 regulates the oil pressure within oil passage 203a connected to out-port 255 by controlling the in-port 254 with one of two lands and drain port EX with the other of the two lands, both lands being formed on the spool 251, responsive to a feedback pressure fed to the end of the spool 251 through a feedback signal pressure in-port 256. A plunger 252 aligned in series coaxially with the spool 251 has a differential piston shape and reciprocates through a stroke which brings it into and out of abutment against the spool 251 when its radially differential portion is fed with the linear solenoid signal pressure ($P_{SLU}$) and when its end face receives the brake B-2 pressure through oil passage 204a, oil passage 204 and the 2-3 shift valve 22. This B-3 control valve 25 also has a plunger 253 which is disposed at the end of spool 251 opposite the plunger 252 for changing the load a spring, located between plunger 253 and spool 251, upon the spool 251, so that the D-range pressure ($P_D$) in oil passage 201b is selectively applied to or released from the end face of the plunger 253 through the B-2 release valve 24.

The relay valve 26 is a spring-loaded spool type change-over valve, and the brake B-2 pressure of the oil passage 204 and a line pressure ($P_L$) are fed to opposite ends of the spool. The relay valve 26 serves to switch the communication of the brake B-3 oil passage 203b between the oil passages 201a and 203a.

Figure 5:
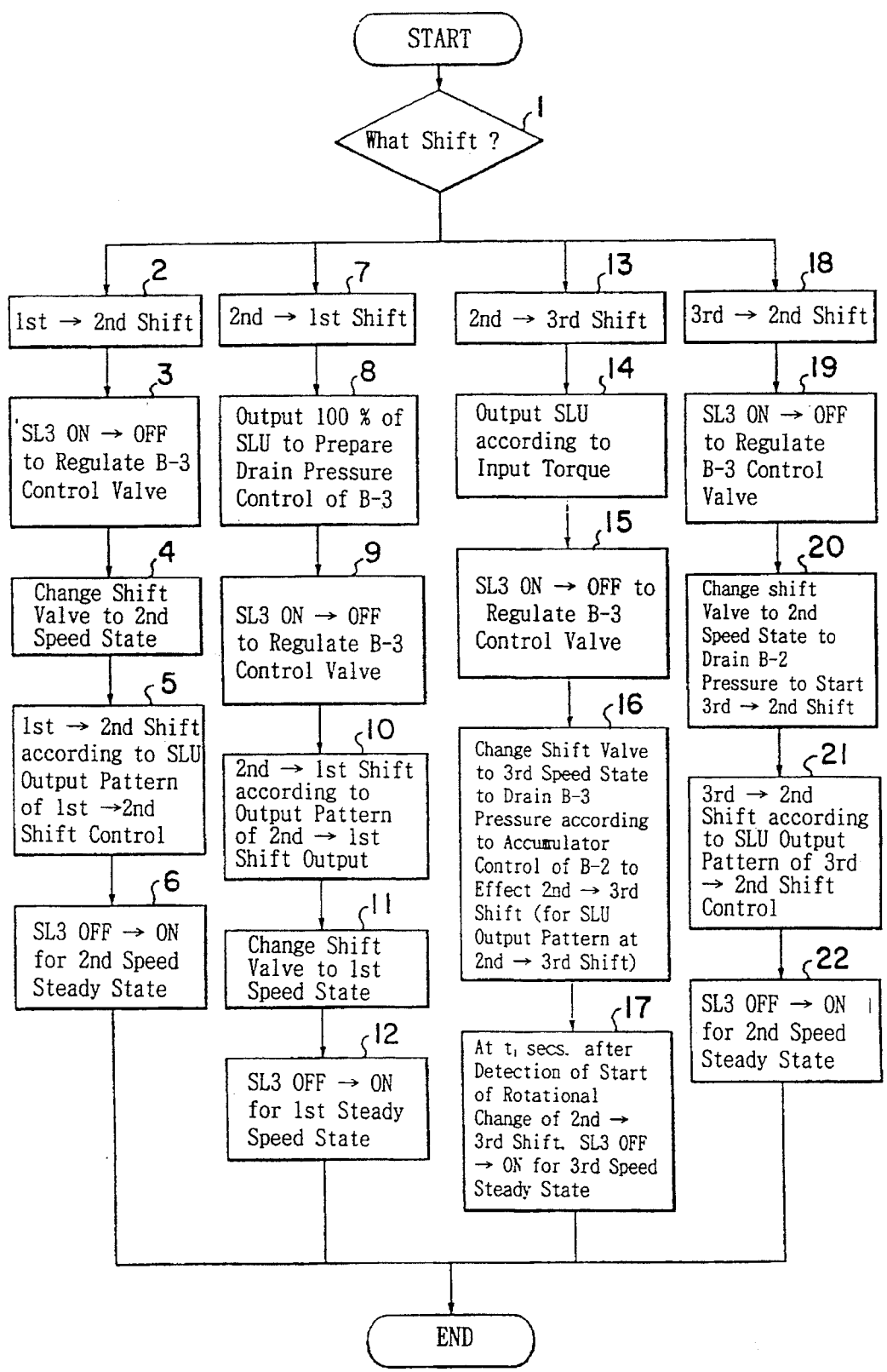
FIG. 5 is a flow chart of the control operations for various shifts in accordance with the first embodiment.

The operations of the above-described hydraulic circuit will now be described with reference to the flow chart of FIG. 5 and the time charts of FIGS. 7 to 10.

(1) 1st→2nd Shift

Figure 6:
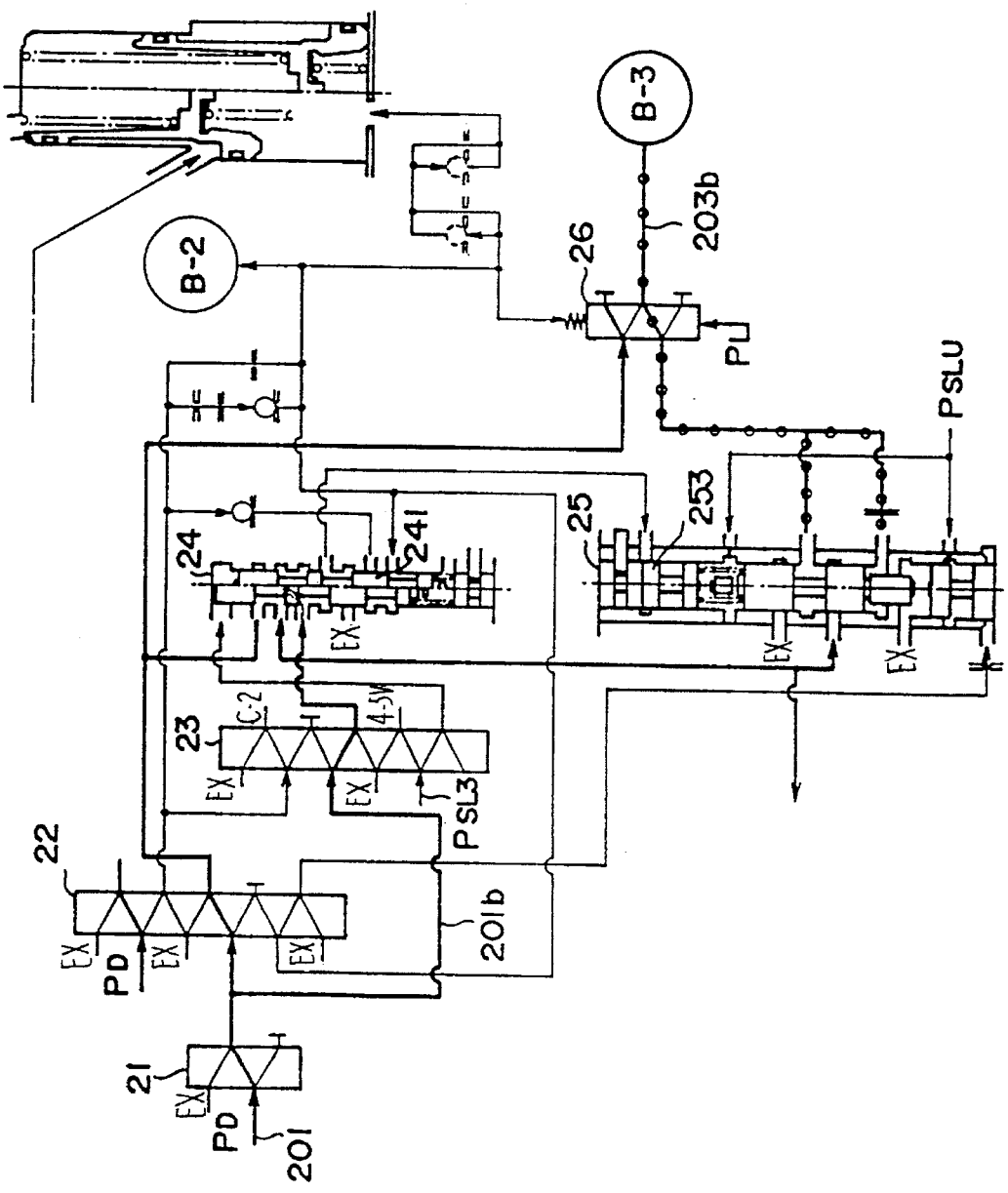
FIG. 6 is a partial hydraulic circuit diagram showing the connections of oil passages in a 1st→2nd shift.
Figure 7:
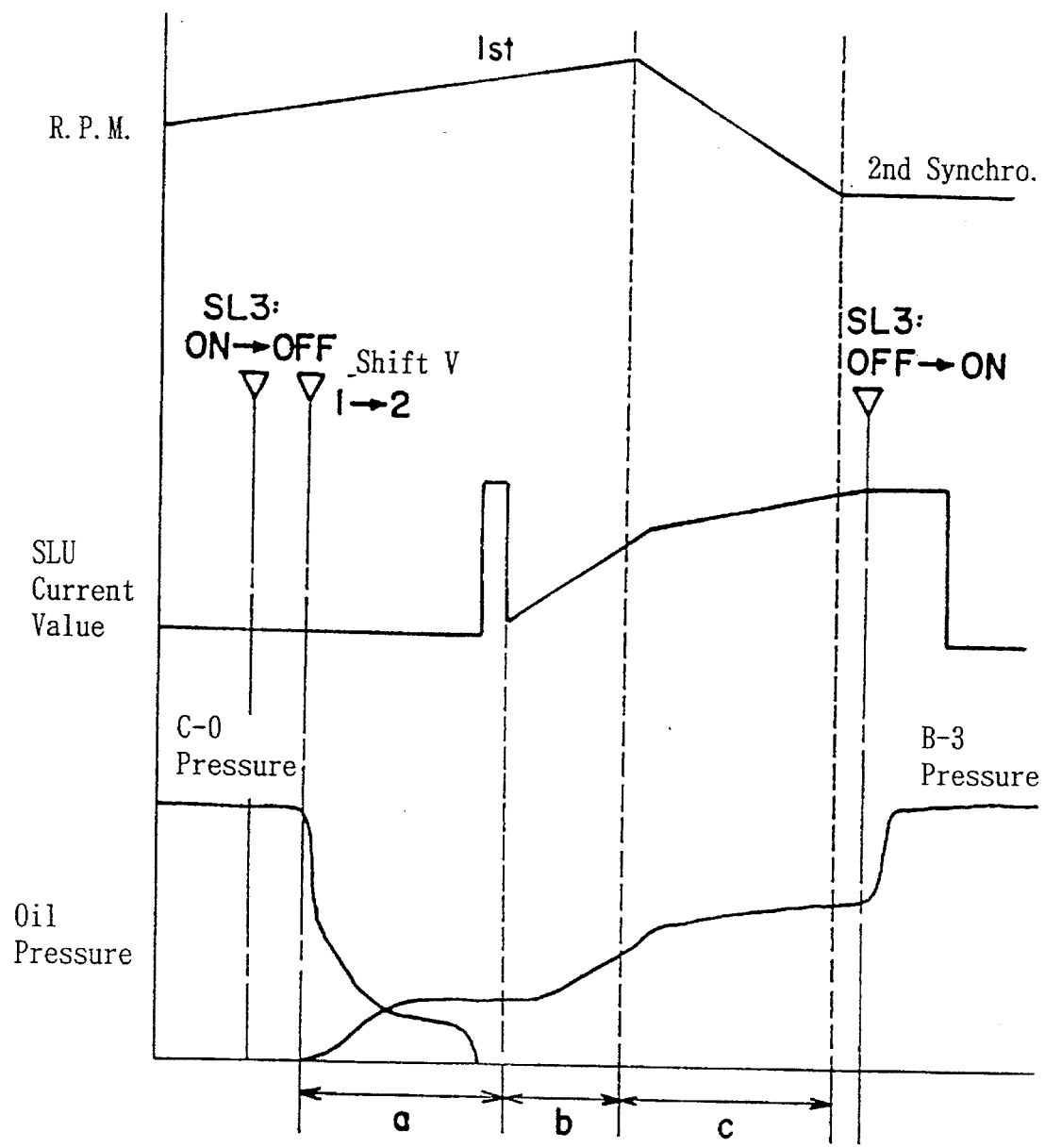
FIG. 7 is a time chart of changes in control parameters in the 1st→2nd shift.
Figure 8:
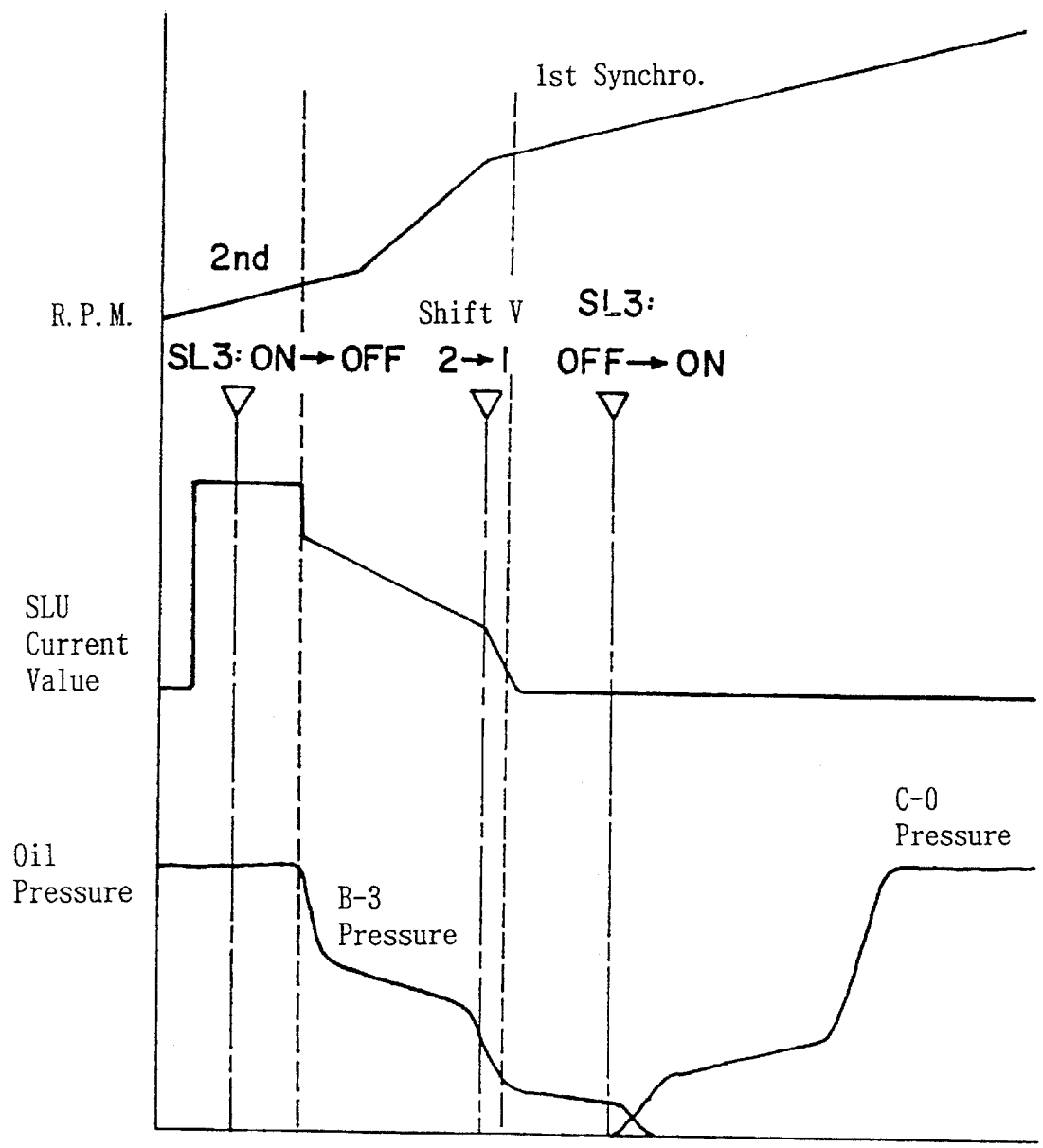
FIG. 8 is a time chart of changes in control parameters in a 2nd→1st shift.

If the 1st→2nd shift of Step 2 is decided at Step 1 the solenoid valve SL3 is switched from ON to OFF at Step 3, prior to the switching of the 1-2 shift valve 21, to bring the B-2 release valve 24 to the right-hand half position shown in FIG. 6. In Step 4, the 1-2 shift valve 21 is changed to a 2nd-speed state to feed the servo B-3, through the relay valve 26 and the oil passage 203b, with the D-range pressure ($P_D$). Pressure $P_D$ is thereby transmitted, in sequence, through the (not-shown) manual valve, the oil passage 201, the 1-2 shift valve 21, the oil passage 201b, the 3-4 shift valve 23 and the B-2 release valve 24 to the B-3 control valve 25 wherein it is regulated to provide the B-3 pressure. In this state the 1-2 shift valve 21 also serves to drain the clutch C-0 pressure. Subsequently, the brake B-3 pressure in control zones a, b and c shown in FIG. 7, is directly controlled by the B-3 control valve 25 (Step 5). Specifically, during the piston stroke (corresponding to zone a) of the B-3 servo, the oil pressure level for fast fill is set by the force of the return spring of the servo B-3. In zone b, the output ($P_{SLU}$) Of the linear solenoid valve SLU is raised at a predetermined rate to change the rotational speed. In control zone c, the linear solenoid valve SLU is subjected to a feedback control according to a target rotational change. When the 1st→2nd speed shift is completed (i.e., in the 2nd synchronization), the solenoid valve signal pressure ($P_{SL3}$) is released (Step 6), when the solenoid valve SL3 is turned ON, to change the B-2 release valve 24 to the left-hand half position shown in FIG. 6. This movement of the B-2 release valve 24 allows the D-range pressure ($P_D$) to be applied through the B-2 release valve 24 to the plunger 253 of the B-3 control valve 25. On the other hand, the D-range pressure ($P_D$) transmitted through the B-2 release valve 24, as switched from another passage through the 2-3 shift valve 22, is continuously fed to the servo B-3 through the B-3 control valve 25 to raise the brake B-3 pressure quickly to the line pressure ($P_L$) until the shift is ended. As a result, in the 2nd-speed (2nd) steady state, the B-3 control valve 25 has its plunger 253 pushed down by the line pressure $P_L$ to lock spool 251 in the lowermost position of the drawing. On the other hand, the spool 241 of the B-2 release valve 24 has been returned to the upper position in the drawing because the solenoid valve SL3 signal pressure ($P_{SL3}$) is released.

(2) 2nd→1st Shift

Simultaneously with a shift decision in Step 1 to proceed to Step 7, the output of the linear solenoid valve SLU is increased to 100% to prepare to drain the brake B-3 pressure. Next, in Step 9, the solenoid valve SL3 is switched from ON to OFF to bring the B-2 release valve 24 to the right-hand half position in the drawing to release the B-3 control valve 25 from its locked state. The drainage of the brake B-3 pressure is now directly controlled by the output of the linear solenoid valve SLU. After the 1st speed (1st) synchronization in Step 10, the 1-2 shift valve 21 is changed at Step 11 to its 1st-speed state to interrupt the feed of the brake B-3 pressure. Finally, the solenoid valve SL3 is switched in Step 12 from OFF to ON to switch the C-0 exhaust valve and to start the feed of the clutch C-0 pressure.

(3) 2nd→3rd Shift

Simultaneously with a shift decision in Step 1 to proceed to Step 13, the output of the linear solenoid valve SLU is increased to 100% so that it can be regulated to a value according to the input torque when the solenoid valve SL3 is switched from ON to OFF. Next, the solenoid valve SL3 is switched from ON to OFF to bring the B-2 release valve 24 to the right-hand half position shown in FIG. 1. In this position the line pressure at the end of the plunger 253 is released through the B-2 release valve 24 to release the B-3 control valve 25 from its locked state. After this, the 2-3 shift valve 22 is switched to the 3rd-speed side to start the feed of the D-range pressure ($P_D$) through the 2-3 shift valve 22 to the servo B-2 as B-2 brake pressure. The B-3 control valve 25 regulates the brake B-3 pressure (as in zone a) to the necessary minimum in accordance with the rise in the brake B-2 pressure. The inertia phase is controlled by the feedback (as in zone b) of the back pressure control of the B-2 accumulator 27. In order to prevent simultaneous locking, a timer control turns ON the solenoid valve SL3 to interrupt the feed of the brake B-3 pressure and start the feed of the clutch C-0 pressure by the B-2 release valve 24. At the end of the accumulation of oil within the B-2 accumulator 27, the relay valve 26 is switched to shut the brake B-3 oil passage, thus completing the shift.

(4) 3rd-Speed (3rd) State

The D-range pressure (PD) is applied not only to one end of the plunger 253 through the 1-2 shift valve 21, the 3-3 shift valve 23 and the B-2 release valve 24, but also to one end of the plunger 252 through the 2-3 shift valve 22, to move the two plungers 253 and 252 upward together with the spool 251, in accordance with the difference between their pressure receiving areas, so that the three components are locked abutting together and compressing the spring.

(5) 3rd→2nd Shift

Figure 10:
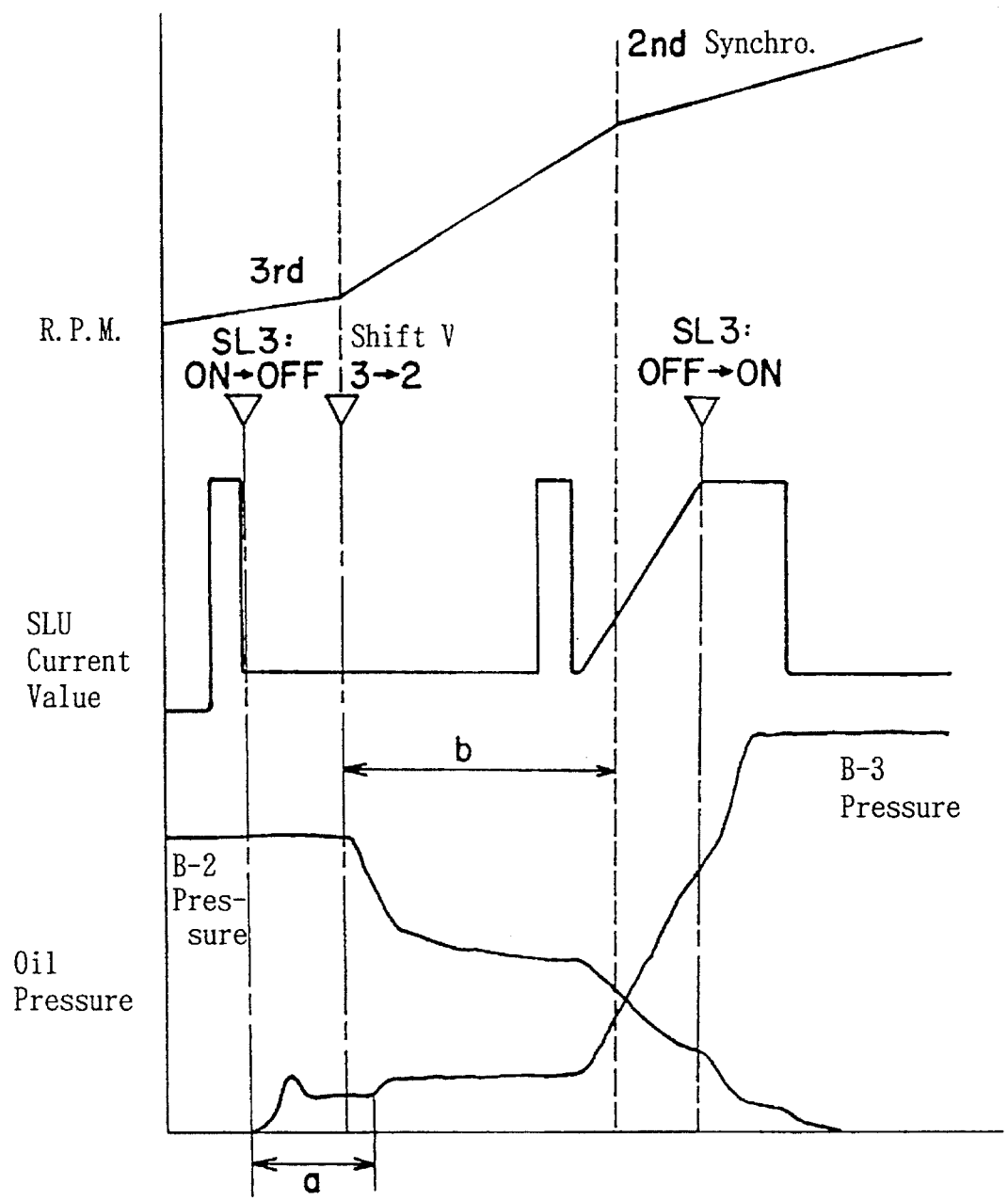
FIG. 10 is a time chart of the changes in control parameters in a 3rd→2nd shift.

Prior to the switching of the 2-3 shift valve 22, the solenoid valve SL3 is switched at Step 19 from ON to OFF to bring the B-2 release valve 24 to the right-hand half position shown in FIG. 1, to release the B-3 control valve 25 from its locked state and to start the feed of the brake B-3 pressure. In next step, Step 20, the 2-3 shift valve 22 is changed to the 2nd-speed state to start the small-orifice drainage of the brake B-2 pressure. By the fast fill of the servo B-3, the piston stroke is ended (as in control zone a) prior to the 2nd-speed (2nd) synchronization. At Step 21, the rotation change is controlled (as in control zone b) by the back pressure control of the B-2 accumulator. As seen in FIG. 10, in a high-speed run, the brake B-3 pressure is held on standby at a low level and then elevated after 2nd-speed synchronization. In a low-speed run, the brake B-2 pressure is held, and the synchronization is achieved by gradually increasing the brake B-2 pressure. After the 2nd-speed (2nd) synchronization, the solenoid valve SL3 is switched at Step 22 from OFF to ON to thereby switch the B-2 release valve 24 which, in turn, effects quick drainage of the brake B-2 and the quick application of the brake B-3, thus completing the shift.

The linear solenoid pressure ($P_{SLU}$) receiving area of the B-3 control valve 25 utilized in the 2nd→3rd shift is larger than that utilized in the 1st→2nd, 2nd→1st and 3rd→2nd shifts. The B-3 control valve 25, shown in FIG. 11 (second embodiment) is slightly different from the control valve of the first embodiment in the manner in which the spring load is applied, but is substantially identical in terms of the structural relationship between the spool 251 and the plunger 252. The B-3 control valve 25 provides a pressure regulating function to regulate the brake B-3 oil pressure within the oil pressure range of the linear solenoid pressure ($P_{SLU}$), in the 1st→2nd, 2nd→1st and 3rd→2nd shift, to thereby retain the torque capacity of the brake B-3. If, therefore, the plunger 252 has a pressure receiving area $A_1$ at its end face and a smaller pressure receiving area $A_2$ and if the spool 251 has a pressure receiving area $A_4$ at its one end face and a smaller pressure receiving area $A_3$, the brake B-3 pressure ($P_{B3}$) will conform to the following relationship:

$$P_{B3}=A_4 \times P_{SLU}/A_3 \qquad (1).$$

Figure 9:
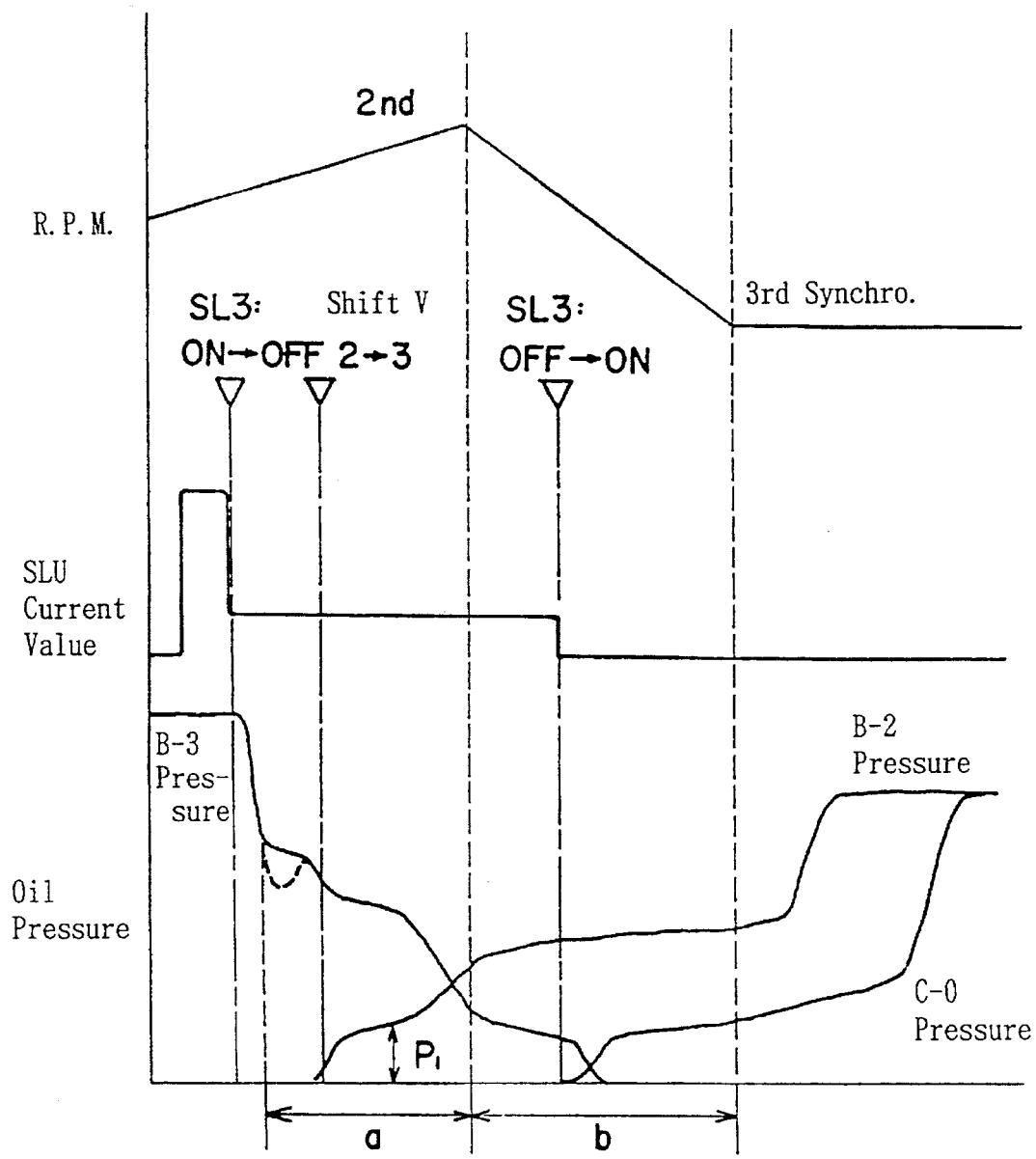
FIG. 9 is a time chart of the changes in control parameters in a 2nd→3rd shift.

In the 2nd→3rd shift, on the other hand, the torque capacity of the brake B-3 has to be retained at the brake B-3 oil pressure in the state where the oil pressure ($P_1$) (as shown in FIG. 9) for the brake B-2 oil pressure to overcome the return spring force acting upon the B-3 control valve 25, the brake B-3 pressure ($P_{B3}'$) at that time has to retain the torque capacity while satisfying the following relationship:

$$P_{B3}'=(A_4' \times P_{SLU}-A_1 \times P_{B2})/A_3 \qquad (2),$$

wherein $A_4'=A_4+A_2$.

The brake B-3 oil pressure may temporarily drop (as indicated by a broken curve in FIG. 9) upon switching the circuit for a 2nd→3rd shift. In order to correct for this drop, the brake B-3 oil pressure ($P_{B3}$) must be set to a high level, as follows:

$$P_{B3}'>P_{B3} \qquad (3).$$

From these relationships (1), (2) and (3), it can be concluded that the pressure receiving area $A_4'$ for the linear solenoid pressure ($P_{SLU}$) must be higher for the 2nd→3rd shift than for the 1st→2nd, 2nd→1st and 3rd→2nd shifts.

In short, according to the control system of the embodiment thus far described, the force required to balance against the oil pressure component which is applied to the control valve 25 from the brake B-2 or the frictional engagement element applied in the shift, can be provided not by the external control signal pressure ($P_{SLU}$) itself but by an increase in the receiving area for the signal pressure. As a result, an increase in the range of the output of external control signal pressure ($P_{SLU}$), which might otherwise be caused by integrating the functions of two prior art valves into a single valve, can be eliminated to allow the control system to be made compact while retaining accuracy. Moreover, the oil pressure which governs regulation of the oil pressure of the brake B-3 (i.e., the first frictional engagement element) is fed to the control valve 25 through the 1-2 shift valve 21 which is not switched in the shift. As a result, it is possible to avoid that transient drop in the oil pressure of the brake B-3, which might otherwise be caused in the shift by switching the 2-3 shift valve 22, thereby reducing the shift shock. By the control of the relay valve 26 with the oil pressure coming from the brake B-2 (the second frictional engagement element), the oil pressure of the brake B-3 (first frictional engagement element) can be released independently of the action of the control valve 25. As a result, the oil pressure of the brake B-3 can be changed, even in case the control valve 25 sticks in the closed position.

Figure 11:
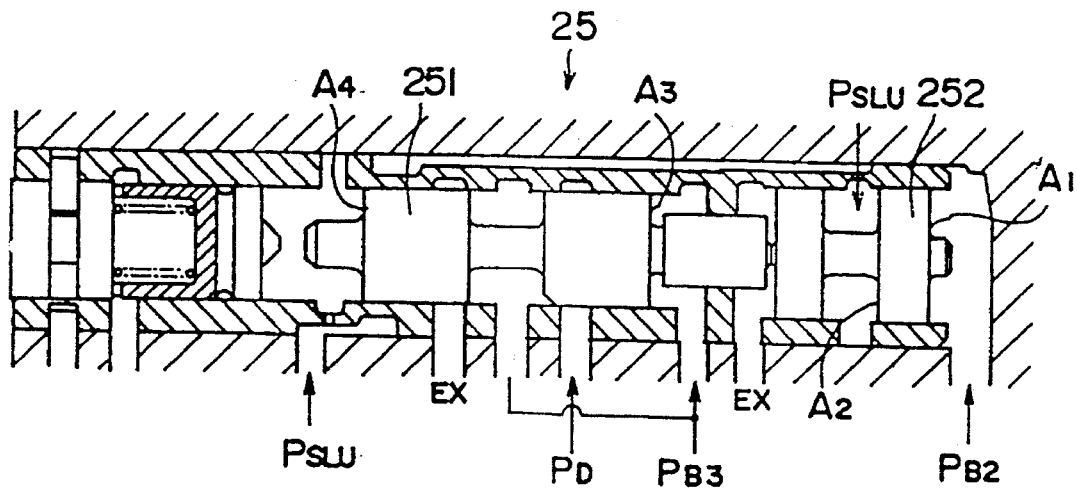
FIG. 11 is an enlarged cross-sectional view of a control valve utilized in a second embodiment of the hydraulic control system of present invention.
Figure 12:
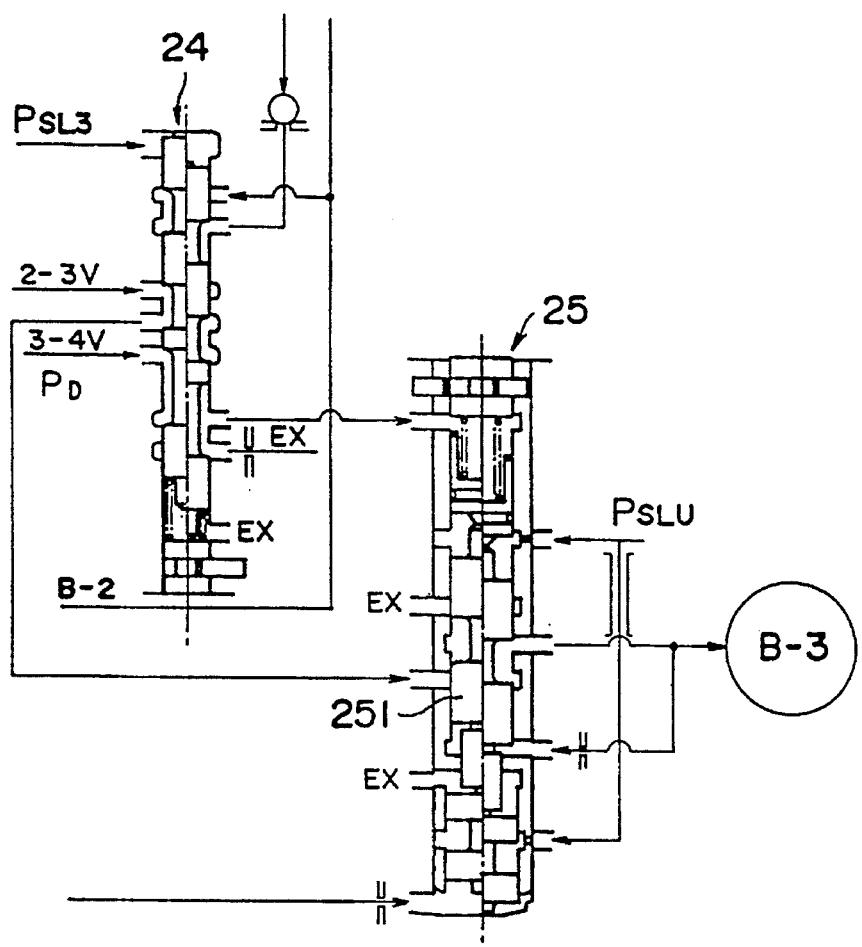
FIG. 12 is a hydraulic circuit diagram of a portion of a hydraulic control system in a second embodiment of the present invention, including the control valve of FIG. 11.

Although the present invention has been described in detail in connection with specific embodiments, it is not limited thereto but, rather, can be modified in various manners within the scope of the definition of the claims. For example, the method of applying the linear solenoid valve SLU pressure to the B-3 control valve 25 can be modified by using the hydraulic circuit configurations of FIGS. 12 to 14. FIG. 12 presents an embodiment in which the valve shown in FIG. 11 is provided in the hydraulic circuit shown in FIG. 1. In the foregoing embodiment, the linear solenoid valve SLU pressure ($P_{SLU}$) and the spring load are applied in parallel with the spool 251 (i.e., are added) so that the pressure regulation must be made with the low linear solenoid valve SLU pressure ($P_{SLU}$), with sacrifice in pressure regulating accuracy and responsiveness. In the embodiment of FIG. 12, on the contrary, those two forces are applied in series (i.e., in opposing directions), so that the pressure regulation can be made with a higher linear solenoid valve SLU pressure ($P_{SLU}$) to provide an advantage in the pressure regulating accuracy and responsiveness.

Figure 13:
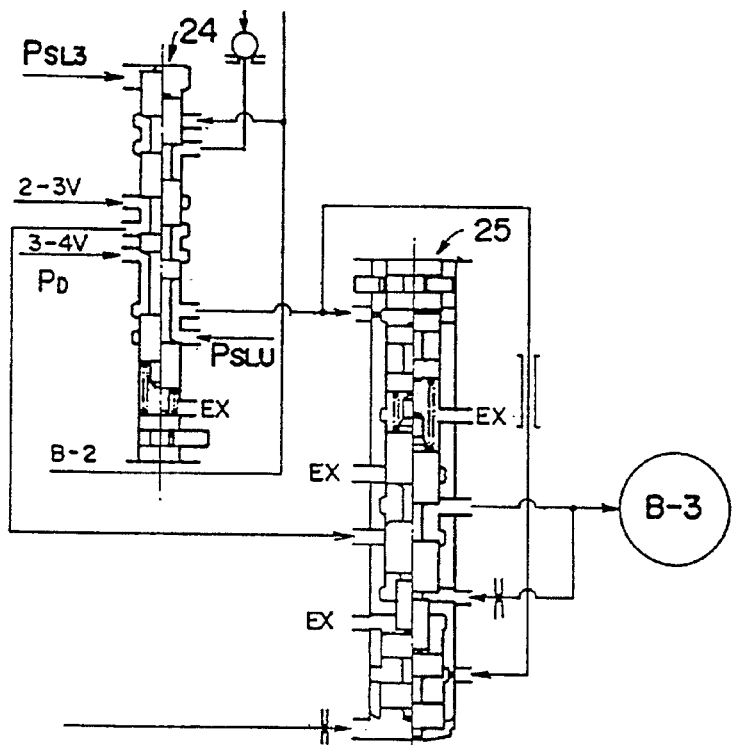
FIG. 13 is a hydraulic circuit diagram of a portion of a hydraulic control system in a third embodiment of the present invention in which the passage for applying an external signal pressure to the control valve is changed.
Figure 14:
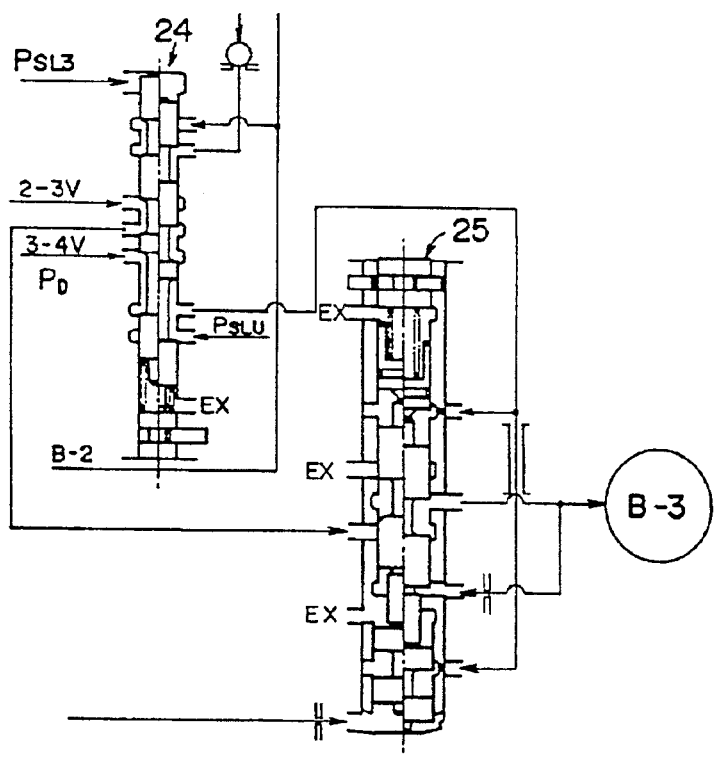
FIG. 14 is a hydraulic circuit diagram of a portion of a hydraulic control system in a fourth embodiment of the present invention in which the connection of a relay valve is changed.

FIG. 13 presents an embodiment, in which the linear solenoid valve SLU pressure ($P_{SLU}$) is applied to the control valve 25 of the embodiment of FIG. 1 through the B-2 release valve 24. FIG. 14 illustrates an embodiment having a similar construction with substitution of the valve of FIG. 11.

In the foregoing embodiments, the feeding/releasing of oil pressure to/from the brake B-3 is through the B-2 release valve 24, the B-3 control valve 25 and the relay valve 26 in the recited order. This order is intended to provide the advantage of ensuring drainage of the brake B-3 pressure by the relay valve 26, even if the brake B-3 pressure cannot be controlled due to a malfunction of the B-3 control valve 25, and the advantage of eliminating pressure loss by controlling the B-2 release valve 24 or the B-3 control valve 25 with the solenoid valve SL3, in a N→D shift to a 3rd-speed state, by cutting off the feed of pressure to the B-3 control valve 25. As previously described, the relay valve 26 is interposed in series between the B-3 control valve 25 and the brake B-3. At the time of a failure, when the relay valve 26 is locked in its drained state while the B-3 control valve 25 is receiving oil pressure, the system of the present invention offers the advantage of eliminating the problem that the brake B-3 pressure is drained, while ensuring the drainage of B-3 pressure in the event of a failure between the B-3 control valve 25 and the brake B-3.

Figure 15:
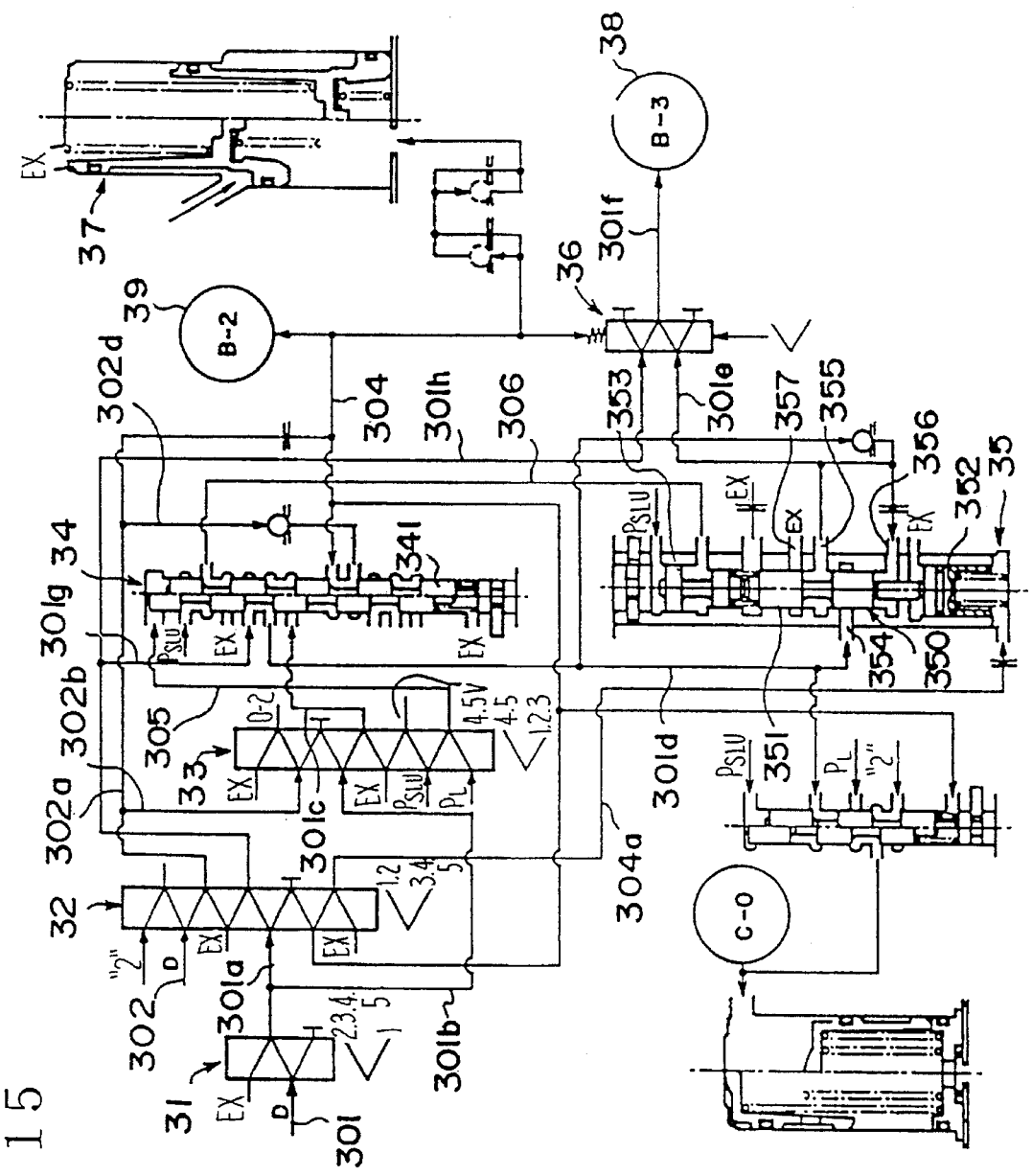
FIG. 15 is a hydraulic circuit diagram of a portion of a hydraulic control system for an automatic transmission according to a fifth embodiment of the present invention.

Next, a fifth embodiment of the present invention will be described with reference to FIGS. 15 to 19. In the automatic transmission 10 of this embodiment of the present invention, the first frictional engagement element is exemplified by the brake B-3, and the second frictional engagement element is exemplified by the brake B-2. Only the elements relevant here are shown in FIG. 15. As shown in FIG. 15, the automatic transmission 10 includes: a brake B-3; a hydraulic servo 38 for controlling the application/release of the brake B-3; an oil passage 301 connected to the hydraulic servo 38 for feeding/releasing the oil pressure to/from the hydraulic servo 38; a B-3 control valve 35, serving as a regulator valve, disposed in the oil passage 301; and signal pressure generating means (e.g. the linear solenoid valve SLU shown in FIG. 4) for applying a signal pressure to the B-3 control valve 35.

The oil passage 301 is composed of a first oil passage 301d for feeding the oil pressure to the B-3 control valve 35, and second oil passages 301e and 301f for feeding the oil pressure from the B-3 control valve 35 to the hydraulic servo 38. The B-3 control valve 35 has a valve member 350, an input port 354 connected to the first oil passage 301d, an output port 355 connected to the second oil passage 301e, and a drain port 357 connected to a drain oil passage EX.

Figure 16:
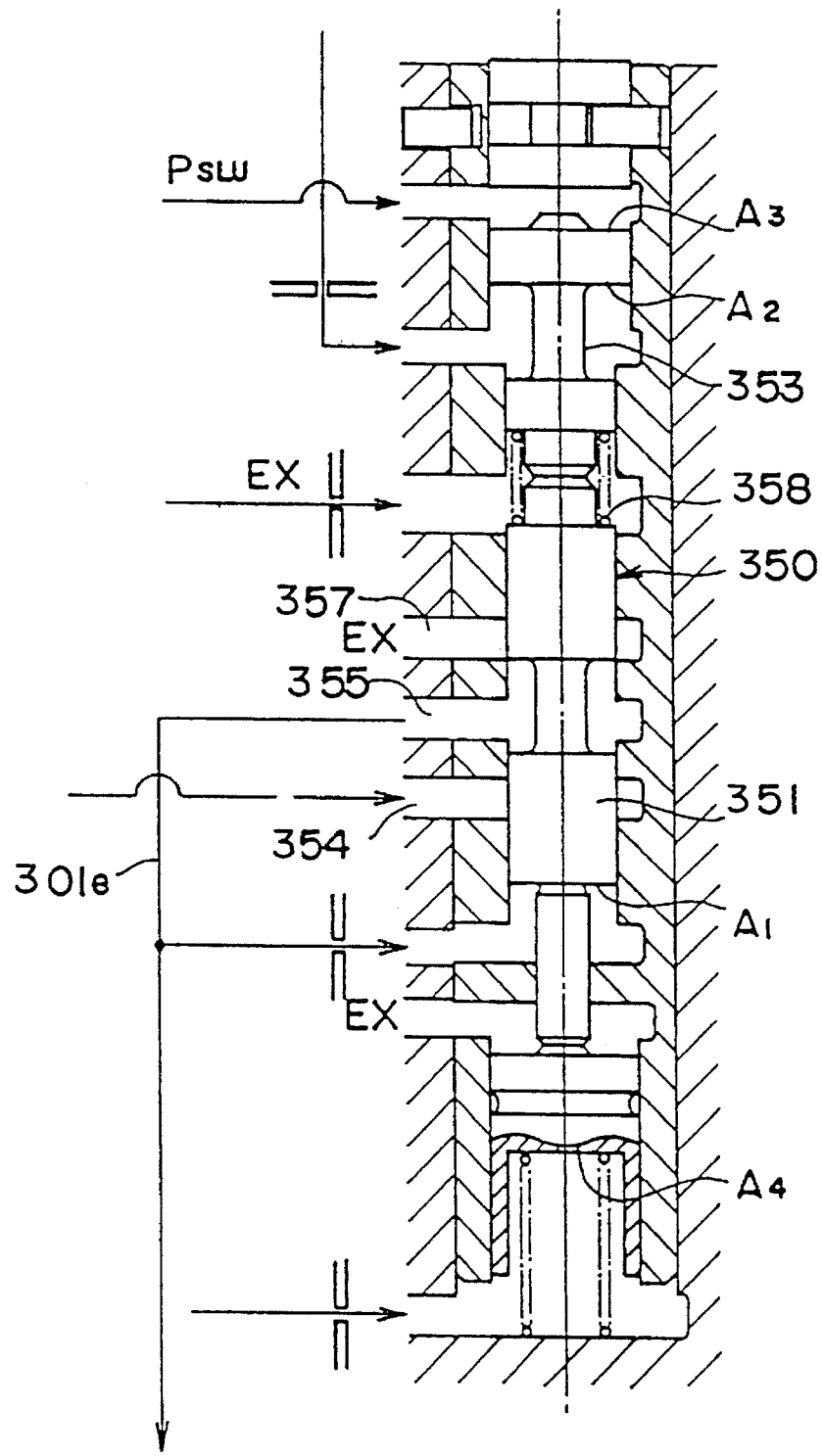
FIG. 16 is an enlarged cross-sectional view showing the details of a regulator valve of the hydraulic control system according to the fifth embodiment.

As shown on an enlarged scale in FIG. 16, the valve member 350 has: a first pressure receiving area $A_1$ to which is applied the feedback pressure in the second oil passage 301e in a direction to provide communication between the output port 355 and the drain port 357; a second pressure receiving area $A_2$ to which is applied the signal pressure ($P_{SLU}$) in a direction to provide the communication between the output port 355 and the drain port 357; and a third pressure receiving area $A_3$ which has a larger diameter than that of the second pressure receiving area $A_2$ and to which is applied the signal pressure ($P_{SLU}$) in a direction to provide communication between the output port 355 and the input port 354. The signal pressure generating means (e.g., the linear solenoid valve SLU) always applies the signal pressure ($P_{SLU}$) to the third pressure receiving area $A_3$ and selectively applies the signal pressure ($P_{SLU}$) to the second pressure receiving area $A_2$.

The valve member 350 of the B-3 control valve 35 is composed of a spool 351 having the first pressure receiving area $A_1$, and a plunger 353 arranged in series coaxial with the spool 351 and having the second and third pressure receiving areas $A_2$ and $A_3$. Between the spool 351 and the plunger 353, is a spring 358 which is biased to move the spool 351 and the plunger 353 apart from each other.

Returning to FIG. 15, the brake B-3 in this embodiment exemplifies the first frictional engagement element for establishing the first gear stage, i.e., the 2nd speed of the automatic transmission, and the brake B-2 which is applied to establish the second gear stage, i.e., a 3rd speed of the automatic transmission when the brake B-3 is released, serves as the second frictional engagement element. The signal pressure generating means includes a B-2 release valve 34 as a change-over valve for switching the application/interruption of the signal pressure ($P_{SLU}$) to the second pressure receiving area $A_2$. The B-2 release valve 34 is designed to feed the signal pressure ($P_{SLU}$) to the third pressure receiving area $A_3$ at least in the shift from 2nd to 3rd speeds and to interrupt the application of the signal pressure ($P_{SLU}$) to the third pressure receiving area $A_3$ after the end of the shift.

The brake B-2, applied when the brake B-3 is released, has a hydraulic servo 39 for controlling the application/release of the brake B-2. The valve member 350 of the B-3 control valve 35 has a fourth pressure receiving area $A_4$ which receives the application pressure of the hydraulic servo 39 in a direction to provide the communication between the output port 355 and the drain port 357.

That circuit portion of the hydraulic circuit, which directly participates in regulating and feeding/releasing the oil pressures of the hydraulic servos 38 and 39 for applying/releasing the brake B-3 and the brake B-2, includes a 1-2 shift valve 31, a 2-3 shift valve 32, a 3-4 shift valve 33, a B-2 release valve 34, a B3 control valve 35, a relay valve 36 and a B-2 accumulator 37. These hydraulic circuit components are controlled by the solenoid valves SL1 to SL4 for switching the individual shift valves, the lockup linear solenoid valve SLU, the accumulator controlling linear solenoid valve SLU for controlling the B-2 accumulator 37 and its back pressure, the linear solenoid valve SLT for outputting the control signal according to the engine load, and so on. Incidentally, the oil pressure for regulating the brake B-3 oil pressure is fed to the control valve 35 through the 1-2 shift valve 31. The relay valve 36 is located between the control valve 35 and the brake B-3 to be controlled by the oil pressure coming from the brake B-2.

A D-range oil passage 301 leading to the not-shown manual valve is branched through the 1-2 shift valve 31, with one branch oil passage 301a being connected through the 2-3 shift valve 32 via an oil passage 301h to the relay valve 36 and further through the valve 36 to the brake B-3 oil passage 301f. The other branch oil passage 301b leads through the 3-3 shift valve 33, an oil passage 301c, the B-2 release valve 34 and the oil passage 301d to the input port 354 of the B-3 control valve 35, from which the oil passage 301b is connected through the oil passage 301e to the relay valve 36.

The other D-range pressure oil passage 302 leading to the manual valve is branched through the 2-3 shift valve 32, with one branch oil passage 302a being connected through an orifice to a brake B-2 oil passage 304. This oil passage 304 is connected through the B-2 release valve 34 and a check valve to the oil passage 302a and through an orifice to the accumulator 37. The other branch oil passage 302b is connected through the 3-3 shift valve 33 to the hydraulic servo of the clutch C-2.

The 3-4 shift valve 33 is connected through a solenoid valve signal pressure oil passage 305 to the B-2 release valve 34 to provide and interrupt the communication between the two oil passages 301b and 302b and to apply a solenoid valve SL3 signal pressure ($P_{SL3}$) to the spool end of the B-2 release valve 34.

The B-2 release valve 34 is formed with a bypass circuit for accelerating the drainage of the oil passage of the accumulator 37 at the release end of the brake B-2 and is provided with a spring-loaded spool 341. The B-2 release valve 34 receives, at the end of its spool 341, the signal pressure ($P_{SL3}$) of the solenoid valve SL3 by way of the 3-3 shift valve 33, so as to provide and interrupt the communication of a bypass oil passage 302d with the brake B-2 oil passage 304, to switch the communication of the D-range pressure oil passages 301c and 301g with the input port 354 of the B-3 control valve 35, and to switch the application of the signal pressure ($P_{SLU}$) to the pressure receiving area $A_2$ of the B-3 control valve 35 via an oil passage 306 and the connection of an oil passage 306 to the drain. As a result, the input port 354 of the B-3 control valve 35 can be fed with the D-range pressure ($P_D$) from the two oil passages 301a and 301b through the B-2 release valve 34 in parallel.

The B-3 control valve 35 is constructed such that the oil pressure of the oil passage 301e leading to the output port 355 is regulated by controlling the input port 354 with one of two lands and the drain port 357 with the other of the two lands, which are formed on the spool 351, by a feedback pressure fed to the end of the spool 351 through a feedback signal pressure in-port 356. A plunger 352 is arranged in series coaxially with the spool 351 and pushes the spool 351, responsive to receipt at its end face of the brake B-2 applying pressure through an oil passage 304a leading to the oil passage 304 of the brake B-2 through the 2-3 shift valve 32. This B-3 control valve 35 is equipped, similar to the previous embodiments, with a plunger 353 which is disposed at the opposite end of the plunger 352 for pushing the spool 351 through the spring 358, so that the solenoid signal pressure ($P_{SLU}$) can be applied to and released from one end face of the plunger 353 at all times and the other end face via the oil passage 306 through the B-2 release valve 34.

Incidentally, the relay valve 36 is a spring-loaded spool type change-over valve, and the brake B-2 pressure of the oil passage 304 and the line pressure ($P_L$) are fed, respectively to opposite ends of the spool, to switch the communication of the brake B-3 oil passage 301f between the oil passages 301e and 301h.

The operations of the control circuit of the fifth embodiment will now be described in the following with reference to the circuit diagram of FIG. 15 and the time charts of FIGS. 17 to 19.

Figure 17:
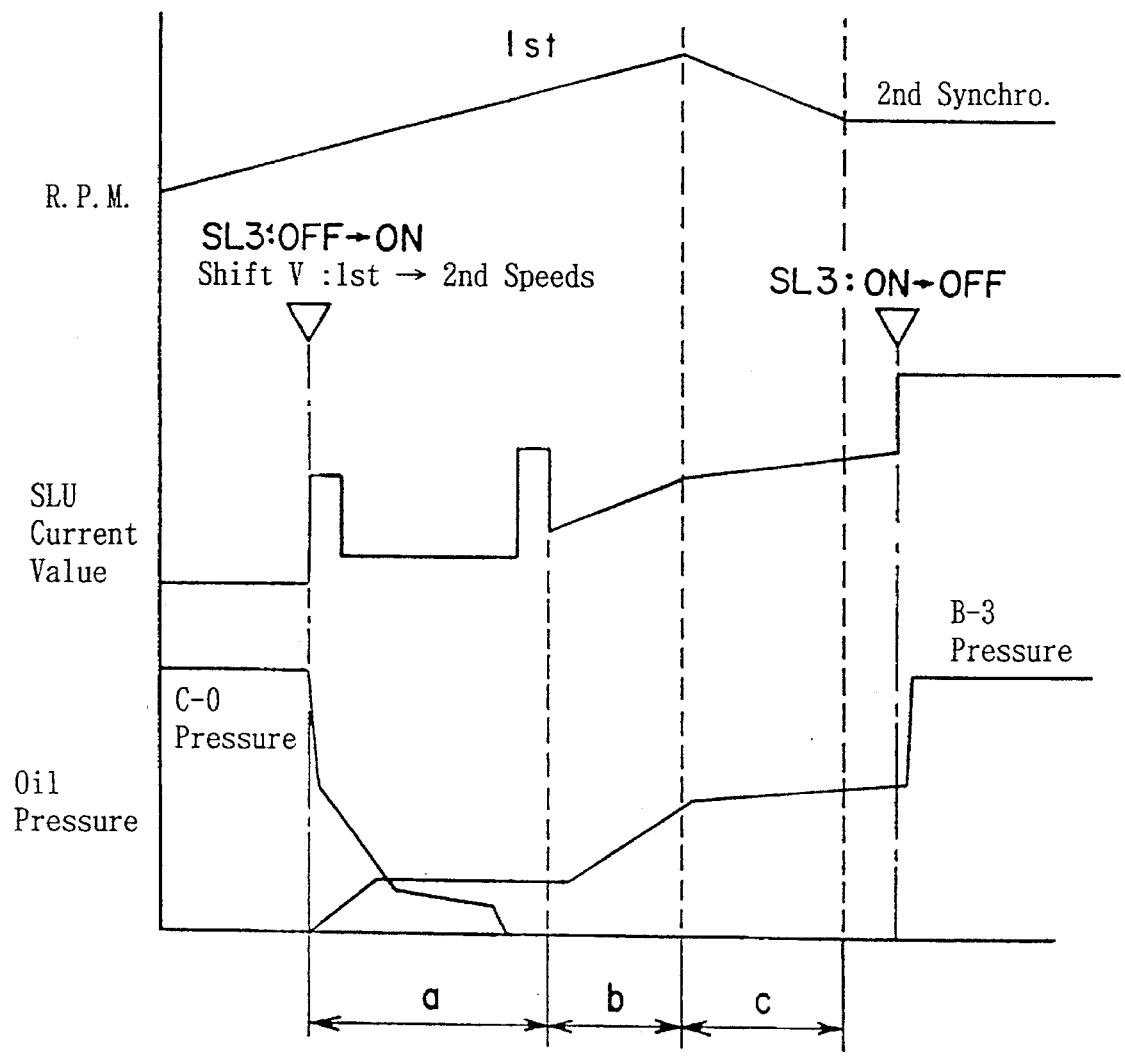
FIG. 17 is a time chart of changes in control parameters in a 1st→2nd shift according to the fifth embodiment.

(1) 1st→2nd Shift Control Operations (FIG. 17)

If the 1st→2nd shift 2 is decided by the electronic control system, the solenoid valve SL3 is switched from OFF to ON to bring the B-2 release valve 34 to the left-hand half position shown in FIG. 1. As a result, the signal pressure ($P_{SLU}$) is applied through the B-2 release valve 34 and the oil passage 306 to bring the B-3 control valve 35 into a small control gain state. Next, the 1-2 shift valve 31 is changed to a 2nd-speed state to feed the D-range pressure ($P_D$) as the brake B-3 pressure to the hydraulic servo 38 through the relay valve 36 and the oil passage 301f. The 1-2 shift valve 31 receives the D-range pressure through the (not-shown) manual valve, the oil passage 301, the 2-3 shift valve 32, the oil passage 301g, the B-2 release valve 34 and the oil passage 301d. In this 2nd speed state the 1-2 shift valve 31 also drains the clutch C-0 pressure. From now on, the brake B-3 pressure, in zones a, b and c, as shown in FIG. 17, is directly controlled by the B-3 control valve 35. Specifically, during the piston stroke (corresponding to the zone a) of the hydraulic servo, the oil pressure level for the fast fill is set by the force of the return spring 358 of the hydraulic servo. In the zone b, the output ($P_{SLU}$) Of the linear solenoid valve SLU is raised at a predetermined rate to change the rotational speed. In the zone c, the linear solenoid valve SLU is subjected to a feedback control according to a target change in rotational speed. When the 1st→2nd shift is completed (i.e., in the 2nd synchronization), the solenoid valve signal pressure ($P_{SL3}$) is applied, provided the solenoid valve SL3 is turned OFF, to change the B-2 release valve 34 to the right-hand half position shown in FIG. 17, to release the signal pressure ($P_{SLU}$) at the pressure receiving area $A_2$ of the plunger 353 of the B-3 control valve 35 and to thereby bring the B-3 control valve 35 into a large gain state. The D-range pressure ($P_D$) through the B-2 release valve 34, as switched from another passage 301c through the 1-2 shift valve 31, is continuously fed to the hydraulic servo through the B-3 control valve 35 to raise the brake B-3 pressure quickly to the line pressure ($P_L$) Until the shift is completed. As a result, in the 2nd-speed (2nd) steady state, the spool 351 is locked in the lowermost position of the drawing. On the other hand, the spool 341 of the B-2 release valve 34 is fixed in its lower position in the drawing because it receives the solenoid valve SL3 signal pressure ($P_{SL3}$).

Figure 18:
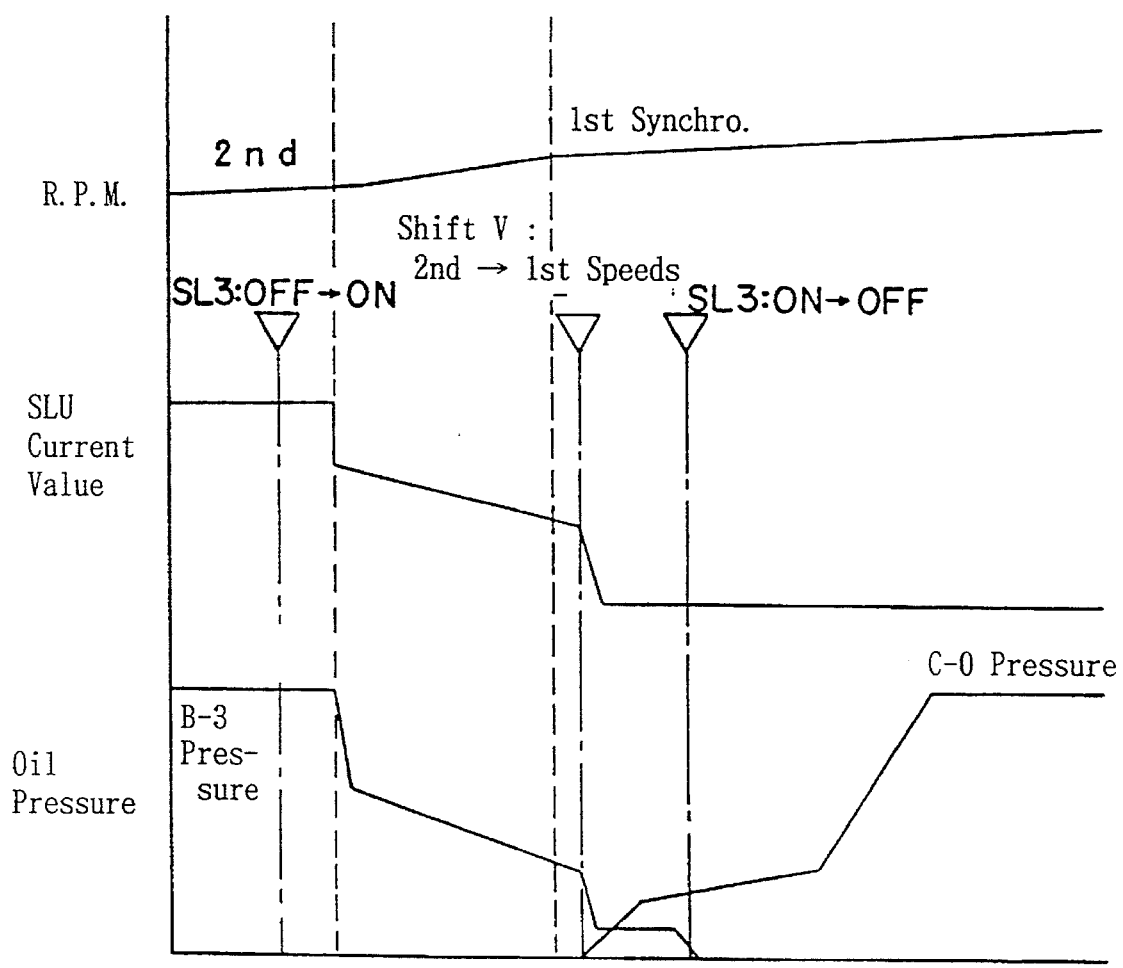
FIG. 18 is a time chart of changes in control parameters in a 2nd→1st shift according to the fifth embodiment.

(2) 2nd→1st Shift Control Operations (FIG. 18)

Simultaneously with a shift decision, the output of the linear solenoid valve SLU is increased to 100% to prepare for controlled draining of the brake B-3 pressure. Next, the solenoid valve SL3 is switched from OFF to ON to bring the B-2 release valve 34 to the left-hand half position in the drawing and to thereby bring the B-3 control valve 35 into a low gain state. The drainage of the brake B-3 pressure is then directly controlled by the output of the linear solenoid valve SLU. After the 1st speed (1st) synchronization, the 1-2 shift valve 31 is changed to its 1st-speed state to cut-off the feed of the brake B-3 pressure and to switch the C-0 exhaust valve to start the feed of the C-0 pressure. After the completion of the 2nd→1st shift is decided, the solenoid valve SL3 is switched from ON to OFF to return the B-2 release valve 34 to the right-hand half position in the drawing to ensure the drainage of the brake B-2 pressure.

Figure 19:
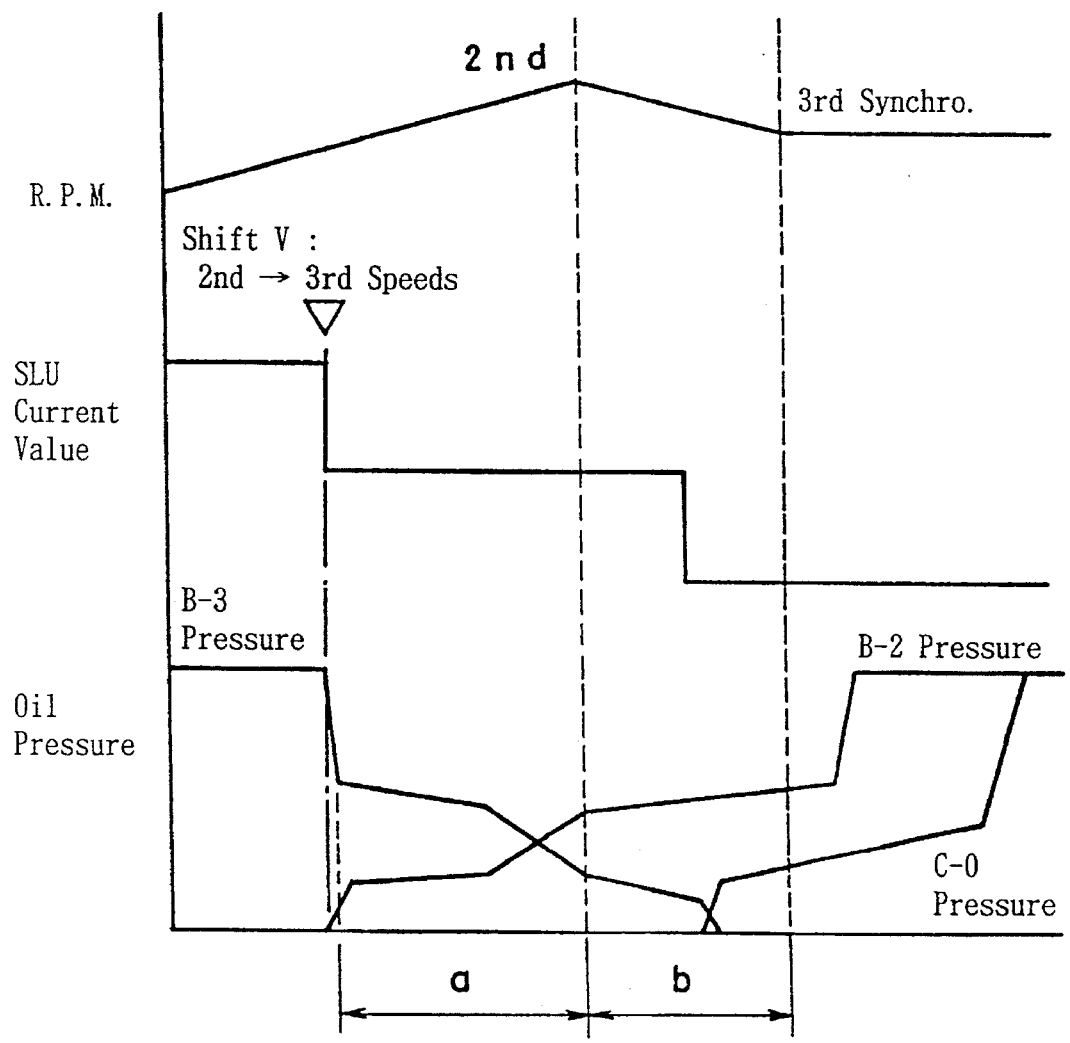
FIG. 19 is a time chart of changes in control parameters in a 2nd→3rd shift according to the fifth embodiment.

(3) 2nd→3rd Shift Control Operations (FIG. 19)

On the basis of the shift decision, the 2-3 shift valve 32 is switched to the 3rd-speed side to start the feed of the D-range pressure ($P_D$) through the 2-3 shift valve 32 to the servo of the brake B-2. By the B-3 control valve 35, the brake pressure is regulated (as in the zone a) to the necessary minimum, in accordance with the rise of the brake B-2 pressure. The inertia phase is accompanied by the feedback control (as in the zone b) by the back pressure control of the B-2 accumulator 37. At the end of the accumulation of oil in the B-2 accumulator 37, moreover, the relay valve 36 is switched to shut the brake B-3 oil passage, thus ending the shift.

Summarizing, in the control system of the fifth embodiment, the force to balance the oil pressure component, which is applied to the B-3 control valve 35 from the brake B-2 or the frictional engagement element applied in the shift (i.e., the 2nd→3rd shift), is provided, not by an increase in the external control signal pressure ($P_{SLU}$) itself, but by increasing the receiving area for the signal pressure. As a result, an increase in the range of output of the external control signal pressure ($P_{SLU}$), which might otherwise result from integration of the valve functions of two prior art valves, can be avoided eliminated to allow the control system to be made compact while preventing loss of accuracy.

What is claimed is:

1. A control system for an automatic transmission comprising:

a first frictional engagement element and a second frictional engagement element;

a first hydraulic servo for controlling the application/release of said first frictional engagement element and a second hydraulic servo for controlling the application/release of said second frictional engagement element;

an oil passage connected to said first hydraulic servo at a single point for feeding/releasing an oil pressure to/from said first hydraulic servo;

a regulator valve disposed in said oil passage for regulating the oil pressure in said oil passage, said regulator valve having a valve member providing a plurality of pressure receiving areas; and signal pressure generating means for applying a signal pressure to said regulator valve during a shift to a predetermined gear stage by engaging of one of said first and second frictional engagement elements and simultaneously releasing the other of said first and second frictional engagement elements, said signal pressure generating means changing said signal pressure during said shift in accordance with a predetermined pattern, said regulator valve regulating the oil pressure in said oil passage during said shift in accordance with said changing signal pressure, wherein said pressure receiving areas of said valve member include:

a first pressure receiving area which receives the oil pressure to said first hydraulic servo as a feedback pressure and is thereby urged in a first direction;

a second pressure receiving area which receives said signal pressure and is thereby urged in a second direction opposite to said first direction;

a fourth pressure receiving area which receives the oil pressure to said second hydraulic servo and is thereby urged in said first direction during said shift; and a third pressure receiving area which receives said signal pressure only during said shift and is thereby urged in said second direction and thereby participates in the regulation of the oil pressure in said first oil passage during said shift.

2. A control system for an automatic transmission according to claim 1, wherein said valve member has a first valve member having said first pressure receiving area and said second pressure receiving area, and a second valve member arranged in series coaxially with said first valve member and having said third pressure receiving area and said fourth pressure receiving area, and wherein said second valve member comes into abutment against said first valve member during said shift.

3. A control system according to claim 1 further comprising an electronic control unit, including a memory stored with said predetermined pattern, for controlling said signal pressure generating means.

4. A control system according to claim 3 wherein said signal pressure generating means is a linear solenoid valve.

5. A control system according to claim 1 wherein said signal pressure generating means is a linear solenoid valve.

6. A control system according to claim 1 further comprising a relay valve interposed in said oil passage between said regulator valve and said first hydraulic servo for releasing oil pressure from said first hydraulic servo responsive to a pressure fed to said second hydraulic servo for applying said second frictional engagement element and a malfunction of said regulator valve.

7. A control system for an automatic transmission comprising:

a first frictional engagement element and a second frictional engagement element;

a first hydraulic servo for controlling the application/release of said first frictional engagement element and a second hydraulic servo for controlling the application/release of said second frictional engagement element;

an oil passage connected to said first hydraulic servo at a single point for feeding/releasing an oil pressure to/from said first hydraulic servo;

a regulator valve disposed in said oil passage for regulating the oil pressure in said oil passage, said regulator valve having a valve member providing a plurality of pressure receiving areas; and signal pressure generating means for applying a signal pressure to said regulator valve during a shift to a predetermined gear stage by engaging one of said first and second frictional engagement elements and simultaneously releasing the other of said first and second frictional engagement elements, said signal pressure generating means changing said signal pressure during said shift in accordance with a predetermined pattern, said regulator valve regulating the oil pressure in said oil passage during said shift in accordance with said changing signal pressure, wherein said pressure receiving areas of said valve member include:

a first pressure receiving area which receives the oil pressure to said first hydraulic servo as a feedback pressure and is thereby urged in a first direction;

a second pressure receiving area which receives said signal pressure and is thereby urged in a second direction opposite to said first direction;

a fourth pressure receiving area which receives the oil pressure to said second hydraulic servo and is thereby urged in said first direction during said shift; and a third pressure receiving area which receives said signal pressure and is thereby urged in said second direction, wherein said third pressure receiving area does not participate in the regulation of the oil pressure in said first oil passage during said shift.

8. A control system for an automatic transmission according to claim 3, wherein said third pressure receiving area does not receive said signal pressure during said shift.

9. A control system for an automatic transmission according to claim 3, wherein said signal pressure generating means includes a change-over valve for cutting off the feed of said signal pressure to said third pressure receiving area during said shift.

10. A control system for an automatic transmission according to claim 4, wherein said signal pressure generating means includes a change-over valve for cutting off the feed of said signal pressure to said third pressure receiving area during said shift.

11. A control system according to claim 7 further comprising an electronic control unit, including a memory stored with said predetermined pattern, for controlling said signal pressure generating means.

12. A control system according to claim 11 wherein said signal pressure generating means is a linear solenoid valve.

13. A control system according to claim 7 wherein said signal pressure generating means is a linear solenoid valve.

14. A control system according to claim 7 further comprising a relay valve interposed in said oil passage between said regulator valve and said first hydraulic servo for releasing oil pressure from said first hydraulic servo responsive to a pressure fed to said second hydraulic servo for applying said second frictional engagement element and a malfunction of said regulator valve.

* * * * *

UNITED STATES PATENT AND TRADEMARK OFFICE
CERTIFICATE OF CORRECTION

PATENT NO. : 5,588,927
DATED : December 31, 1996
INVENTOR(S) : TSUKAMOTO et al

It is certified that error appears in the above-indentified patent and that said Letters Patent is hereby corrected as shown below:

Col. 1, line 24, "muse" should read --must--.

Col. 2, line 14, "application/ release" should read --application/release--.

Col. 5, line 5, "B-I" should read --B-1--.

Col. 8, line 24, "Of" should read --of--.

Col. 9, line 22, "3-3" should read --3-4--.

Col. 12, line 61, "3-3" should read --3-4--.

Col. 13, line 6, "3-3" should read --3-4--;

line 19, "3-3" should read --3-4--;

line 64, "iS" should read --is--.

UNITED STATES PATENT AND TRADEMARK OFFICE
CERTIFICATE OF CORRECTION

PATENT NO. : 5,588,927
DATED : December 31, 1996
INVENTOR(S) : TSUKAMOTO et al

It is certified that error appears in the above-indentified patent and that said Letters Patent is hereby corrected as shown below:

Col. 14, line 13, "Of" should read --of--; and line 57, after "brake" insert --B-3--.

Signed and Sealed this

Thirtieth Day of September, 1997

*Attest:*

BRUCE LEHMAN

*Attesting Officer*  *Commissioner of Patents and Trademarks*